(12) United States Patent
LaRue

(10) Patent No.: US 8,648,710 B2
(45) Date of Patent: *Feb. 11, 2014

(54) SYSTEM AND METHOD FOR PLAYING A GAME BASED ON A COIN TOSS

(76) Inventor: Daniel V. LaRue, Newbury, MA (US)

(*) Notice: Subject to any disclaimer, the term of this patent is extended or adjusted under 35 U.S.C. 154(b) by 291 days.

This patent is subject to a terminal disclaimer.

(21) Appl. No.: 13/251,521

(22) Filed: Oct. 3, 2011

(65) Prior Publication Data

US 2012/0080840 A1   Apr. 5, 2012

Related U.S. Application Data

(60) Division of application No. 12/464,060, filed on May 11, 2009, now Pat. No. 8,031,066, which is a continuation-in-part of application No. 11/858,948, filed on Sep. 21, 2007, now Pat. No. 7,532,111.

(60) Provisional application No. 60/861,228, filed on Nov. 27, 2006, provisional application No. 60/898,373, filed on Jan. 30, 2007.

(51) Int. Cl.
*G08B 1/08* (2006.01)
*A63B 69/00* (2006.01)
*A63F 9/24* (2006.01)

(52) U.S. Cl.
USPC ............ 340/539.1; 340/323 R; 340/815.4; 340/573.1; 345/15; 463/16; 348/157; 473/569; 702/141

(58) Field of Classification Search
USPC ............ 340/539.1, 323 R, 573.1, 815.4
See application file for complete search history.

(56) References Cited

U.S. PATENT DOCUMENTS

| | | |
|---|---|---|
| 5,189,711 A | 2/1993 | Weiss et al. |
| 5,232,399 A | 8/1993 | Le Hong et al. |
| 5,619,066 A | 4/1997 | Curry et al. |
| 5,809,179 A | 9/1998 | Marimont et al. |
| 5,867,256 A | 2/1999 | Van Rheeden |
| 6,157,898 A | 12/2000 | Marinelli |

(Continued)

OTHER PUBLICATIONS

International Search Report and Written Opinion for Application No. PCT/US07/85651 dated Sep. 15, 2008 (18 pages).

(Continued)

*Primary Examiner* — Donnie Crosland
(74) *Attorney, Agent, or Firm* — ARC IP Law, PC; Joseph J. Mayo

(57) ABSTRACT

System and method for playing game based on coin toss, may utilize sensors to detect physical movement of coin or instrumented coin, communicate sensor-derived data to remote graphical display system, display virtual coin that represents movement and orientation of tossed coin. May utilize sensor, communication, display, game systems and optional message gateway. Sensor system and part of wireless communication system may be external or embedded in coin. Graphical coin movement and orientation may mimic the actual coin being tossed or may be represented as any avatar or other graphical object that represents the coin including celebrity pictures, videos, faces, logos or any other object that may represent a "head" or "tail". May generate a random number that allows viewers to win a prize. Viewers may guess result of coin toss before toss and win prize if they guess the result correctly.

20 Claims, 15 Drawing Sheets

(56) References Cited

U.S. PATENT DOCUMENTS

| | | | |
|---|---|---|---|
| 6,542,645 | B1 | 4/2003 | Silverbrook et al. |
| 6,917,692 | B1 | 7/2005 | Murching et al. |
| 7,187,783 | B2 | 3/2007 | Moon et al. |
| 7,532,111 | B2 * | 5/2009 | LaRue ................ 340/539.1 |
| 8,031,066 | B2 * | 10/2011 | LaRue ................ 340/539.1 |
| 2003/0086123 | A1 | 5/2003 | Torrens-Burton |
| 2006/0211482 | A1 | 9/2006 | Pimienta et al. |

OTHER PUBLICATIONS

Supplemental Search Report for European Patent Application EP 07 85 4792 dated May 26, 2010 (5 pages).

Pingali, Ball Tracking and Virtual Replays for Innovative Tennis Broadcasts, Pattern Recognition, ICPR Proceedings 2000, vol. 4, Sep. 3, 2000 (5 pages).

McNeill et al, Coin Recognition using Vector Quantization and Histogram Modeling.

* cited by examiner

SYSTEM AND METHOD FOR PLAYING A GAME BASED ON A COIN TOSS

This application is a divisional of U.S. patent application Ser. No. 12/464,060, filed 11 May 2009, now U.S. Pat. 8,031,066, which is a continuation in part of U.S. patent application Ser. No. 11/858,948, filed 21 Sep. 2007, now U.S. Pat. No. 7,532,111, which claims the benefit of U.S. Provisional Patent Application Ser. No. 60/861,228 filed 27 Nov. 2006 and U.S. Provisional Patent Application Ser. No. 60/898,373 filed 30 Jan. 2007 the specifications of which are all hereby incorporated herein by reference.

BACKGROUND OF THE INVENTION

1. Field of Invention

Embodiments of the invention described herein pertain to electronic motion sensing, communication of sensor-derived data, three-dimensional graphic display and gaming. More particularly, but not by way of limitation, one or more embodiments of the invention enable a system and method for playing a game based on a coin toss that may utilize a system and method for graphically displaying a coin toss using sensors to detect the physical movement of a coin, e.g., an instrumented coin or coin observed by external sensors, communication of sensor-derived data to a remote graphical display system, and display of a virtual coin or graphical coin that represents the movement and orientation of the actual coin.

2. Description of Related Art

During an athletic event, for example football or soccer, a coin toss is used to determine which team is given the choice of playing direction and/or possession of the ball, i.e., the initial advantage. Before the coin toss, an official such as a referee will show both sides of a coin to the respective teams. The referee will toss the coin into the air, and one team guesses what side of the coin will face up when the coin lands on the ground. Only the referee and the team members in the vicinity of the coin toss see the movement and orientation of the coin as it is tossed. A coin toss may also be used for gambling, games and other entertainment.

A device which relates to a coin with any functionality other than currency is found in U.S. Pat. No. 5,619,066 filed Aug. 31, 1994 to Curry et al., which describes a coin shaped memory object (see Col. 2, 11. 14-31). The '066 device does not contain any instrumentation to provide location, position, orientation or any other spatial measurement. In summary, there are no known coin devices that are instrumented to provide their spatial information and communicate that information for display.

Thus during a suspenseful part of the pre-game activities, thousands of people viewing the game in the stadium and many thousands of people viewing on television (TV) cannot see the movement and orientation of the coin before, during, and after the toss. It would be beneficial to allow viewers to observe the coin toss without requiring that the viewers wait for the referee to announce the result. In addition, there is no known system that allows viewers of the coin toss to play a game that allows the viewers to guess the result of the coin toss and win a prize based on the result of the toss. Hence, there is a need for a system and method for playing a game based on a coin toss that may utilize a system and method for graphically displaying a coin toss so that the viewing audience may observe the coin toss as it occurs and observe the result of the coin toss when the coin comes to a resting position.

BRIEF SUMMARY OF THE INVENTION

One or more embodiments of the invention enable a system and method for playing a game based on a coin toss that may utilize a system and method for graphically displaying a coin toss using sensors to detect the physical movement of a coin, e.g., an instrumented coin or coin observed by external sensors, communication of sensor-derived data to a remote graphical display system, and display of a virtual coin or graphical coin that represents the movement and orientation of the instrumented coin. Embodiments of the invention provide the following advantages.

Allows the anyone to see the movement and orientation of the coin and more fully experience the coin toss:

- Allows stadium or television viewers to experience the coin toss as it occurs and instantly view the result of the toss when integrated with a stadium large screen monitor such as a JUMBOTRON®, with a television broadcast, or other devices.
- Allows viewers to experience the coin toss in multimedia having multiple aspects. For instance showing the video from the field during the coin toss on one part of the TV screen and showing the virtual coin on another part of the screen.
- Allows for custom "heads" or "tails" images on the virtual coin. This allows the sponsors' logos or for noteworthy figures or persons or other interesting images to be used for the "heads" or "tails" of the coin.
- Allows sponsors to customize the coin or overlay sponsor logos onto the screen and/or coin. This allows for broadcasters to obtain sponsor funding for the coin toss and as a lead-in to a related television commercial showing the sponsor's product(s) for example.
- Allows for virtual camera (three-dimensional view port) to be manipulated during the coin toss to show the virtual coin from multiple angles and/or changing angles and zoom factors, e.g., provides views of the coin toss that would otherwise not be possible.
- Allows for the coin toss to be replayed via the graphical display. This allows the audience to see the coin toss again in fast or slow motion.
- Embodiments of the invention enable a system that eliminates controversy, errors and delays by providing fully open disclosure of the coin toss for immediate observation by the audience of the coin toss as it occurs.
- Enables viewers to guess the result of the coin toss, for example via text messaging before the toss, and win a prize based on the result of the coin toss.

BRIEF DESCRIPTION OF THE FIGURES

The above and other aspects, features and advantages of the invention will be more apparent from the following more particular description thereof, presented in conjunction with the following drawings wherein.

DETAILED DESCRIPTION OF THE INVENTION

Figure 1A:
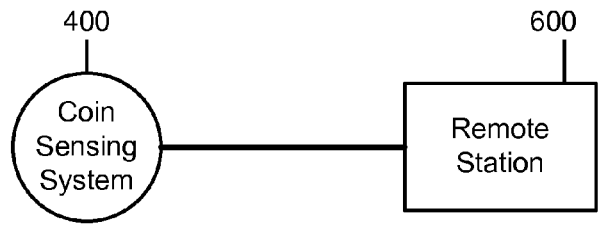
FIG. 1A is a block diagram illustrating the sensing and communication between two physical components of an embodiment of the invention, the coin sensing system and the remote station.

A system and method for playing a game based on a coin toss that may utilize a system and method for graphically displaying a coin toss using sensors to detect the physical movement of a coin or an instrumented coin, data communication to a remote graphical display system, and display of a virtual coin or graphical coin that represents the movement and orientation of the instrumented coin will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Embodiments of the invention may include a sensor system, a communication system and a display system wherein the display system may couple with a game system and message gateway, for example a Short Message Service (SMS) gateway that interacts with cell phones. In one or more embodiments, the sensor system and part of a wireless communication system are embedded in a coin shaped housing. The display system and part of the wireless communication system may include a remote station. The sensor system senses the coin's orientation, i.e. which coin face is up, and also senses the dynamic movements of the coin, if the coin is changing its orientation or position. The game system may be utilized to collect guesses from viewers via the message gateway, as sent in by the viewers using cell phones for example. The game system may then either alert all users who correctly guess the result of the coin toss that they have won a prize, or may utilize a random number or numbers to select a subset of the viewers who have correctly guessed the result of the coin toss and alert the subset of viewers that they have won a prize.

Thus the sensor system senses which side is up and senses the dynamics of motion and position when the coin is in the air during a coin toss. In one or more embodiments, sensor-derived data from the sensor system is transferred to the communication system within the coin. In one or more embodiments, the coin portion of the communication system uses data communication techniques to format sensor-derived data and wirelessly transmit the data to the remote station.

The remote station's portion of the communication system uses data communication techniques and receives sensor-derived data from the coin, interprets the data, and transfers the data to the display system. A virtual coin or graphical representation of the coin may be presented on the display system. The graphical coin movement and orientation may be displayed by the display system in response to the sensor-derived data received from the sensor system. The graphical coin movement and orientation may mimic the actual coin being tossed or may be represented as any avatar or other graphical object that represents the coin, such as brands, logos or for example, other information associated with a sponsor. An example coin may depict a trademark or service mark or any other saying or slogan as well, e.g., "tastes great" for "heads", "less filling" for "tails", or two rival beer company logos each representing one side of the coin where the winner of the toss gets a discount at concession stands if the opening toss is won by a particular beer company. For example, the coin may be represented by a celebrity flipping head over heels and landing "heads up" or "tails up", i.e., with their face showing or their "tail" showing. In one embodiment, this "heads" may be represented by one or more faces, such as the faces of a cheerleading squad or beer representatives or models, while the "tails" portion may be represented by one or more reverse or "tail" views of the same group or different group of individuals or other objects associated with the "heads" side. The numbers of objects representing the "heads" and "tails" may or may not be equal.

The graphical coin's starting orientation (heads or tails) and the graphical coin's ending orientation may track the orientation of the actual coin being tossed within prescribed error limits. The starting and ending orientation (orientations that coin flipping audiences generally care about) are usually important aspects of the coin toss as they determine which team has the initial choice of direction, ball or other advantage. In one or more embodiments, the display system interfaces to a television broadcaster's network and/or to a stadium large screen display. As such, using these embodiments detailed herein, viewers can see the virtual coin in any graphical depiction and observe the coin toss of the virtual coin.

Embodiments of the invention thus show viewers a graphical coin with heads up and tails up orientations to indicate the heads up and tails up positions of the actual tossed coin. Embodiments show the viewers graphical coin movement and orientation other than heads up and tails up orientations, for instance rotating in the air, in a way that is stimulating to the viewers and in a way that may reflect the actual coin movement and orientation to any accuracy level desired. Hence, embodiments of the invention give viewers an enhanced, virtual view of the coin toss. Embodiments of the invention provide an opportunity for the television broadcasters and stadiums to add a commercial sponsor during the graphical, virtual coin toss.

The components included in the physical system of one or more embodiments of the invention are illustrated in the block diagram of FIG. 1A. Coin sensing system 400 has a coin-like look and feel and is connected to remote station 600 via a communication link. The communications link in this figure and all others described herein are shown as a straight lines unless otherwise denoted. In this figure, the communication link is thus shown connecting coin sensing system 400 and remote station 600.

Figure 2A:
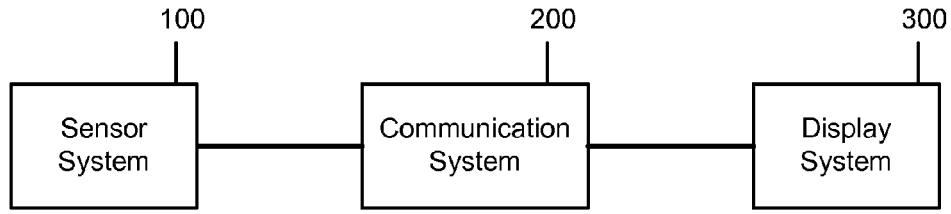
FIG. 2A is a block diagram of the logical components of this invention, the sensor system, the communication system and the display system.
Figure 2B:
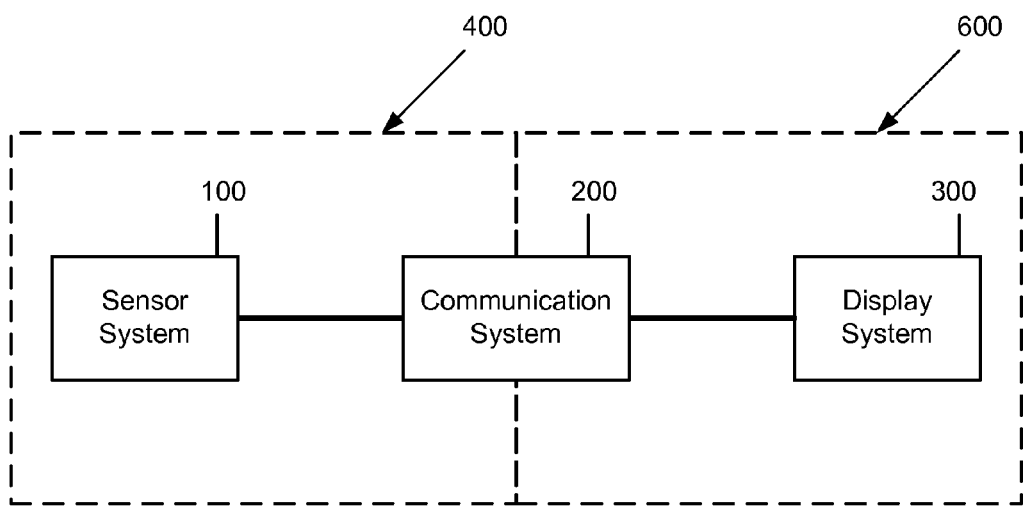
FIG. 2B is a block diagram illustrating how the logic components, the sensor system, the communications system and the display system are contained in the physical system of an embodiment (coin sensing system and remote station).

The components included in the logical system of one or more embodiments of the invention are illustrated in the block diagram of FIG. 2A. Sensor system 100 is connected to the communication system 200 by a data path. The communication system is connected to the display system 300 by a data path. Data paths are shown as black lines herein unless specifically denoted as another object. Here data paths are shown respectively connecting objects 100 to 200 to 300. FIG. 2B illustrates how the logical components are distributed amongst the physical components in this embodiment of this invention. Sensor system 100 and part of communication system 200 are contained in the coin system 400. Display system 300 and part of communications system 200 are contained in the remote station 600.

Figure 3A:
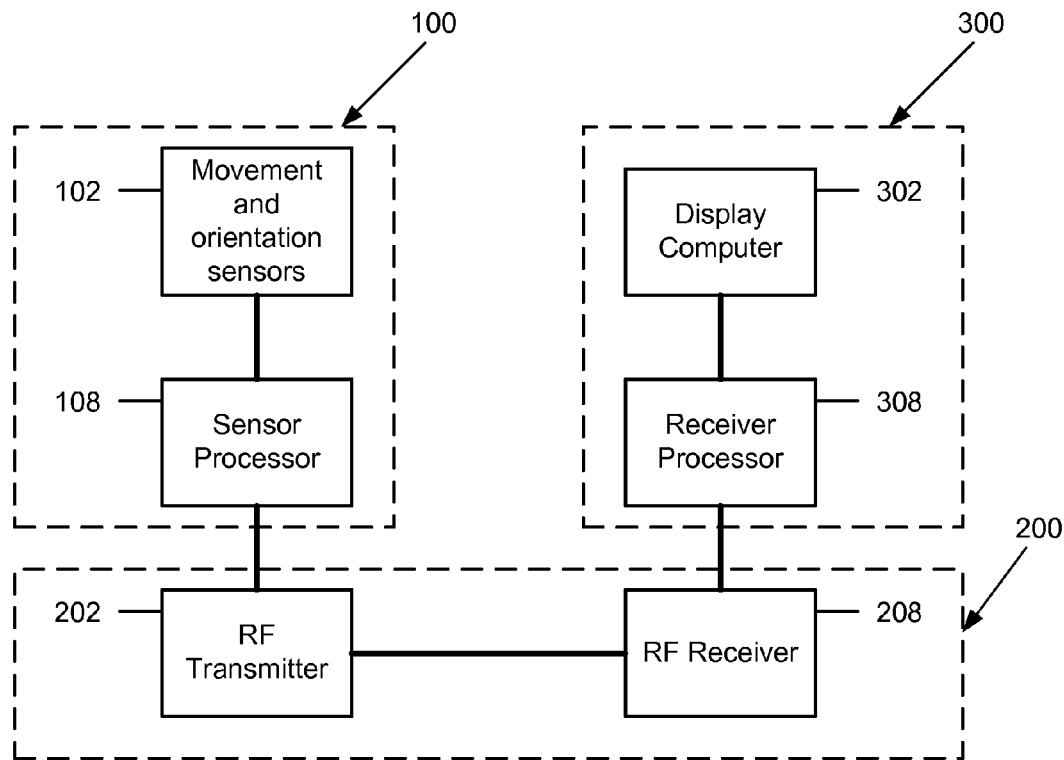
FIG. 3A is a block diagram illustrating the logical components of an embodiment divided into logical sub-components.

FIG. 3A illustrates the logical sub-components that comprise the logical components. Sensor system component 100 includes sub-components movement and orientation sensors 102 and sensor processor 108. The movement and orientation sensors are connected to the sensor processor via a data path. The communication system component 200 includes sub-components RF transmitter 202 and RF receiver 208. The sensor processor is connected to the RF transmitter via a data path. The RF transmitter is connected to the RF receiver via a radio frequency (RF) communication link (shown as a black line between RF Transmitter 202 and RF Receiver 208 although one skilled in the art will recognize that a physical wire is not required to be utilized with this communication link). Display system component 300 includes display computer 302 and receiver processor 308. The display computer and receiver processor are connected via a data path. The receiver processor is connected to the RF receiver via a data path. Unless noted otherwise, data paths are depicted as black lines in the figures and represent any type of communications channel that can transport data from one block to another in one or both directions, such as physical wires, optical lines, wireless links or any other method of transferring data.

Figure 3B:
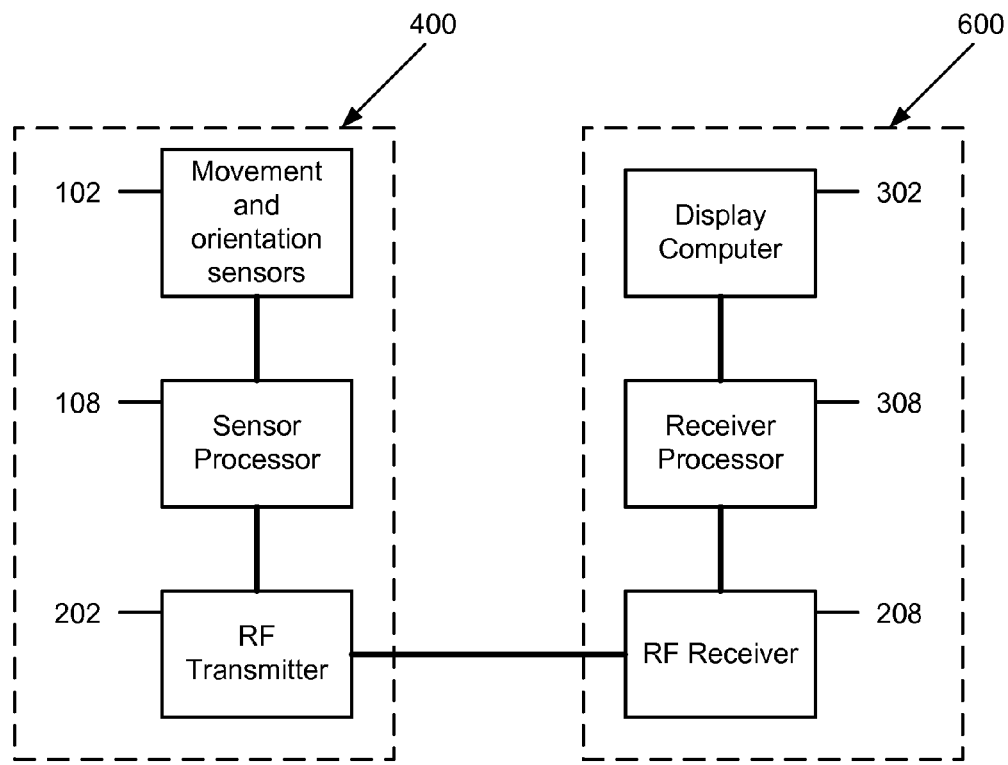
FIG. 3B is a block diagram illustrating how the logic sub-components, are contained in the physical system of an embodiment.

FIG. 3B illustrates how the logical sub-components are distributed amongst the physical components in this embodiment of the invention. Sub-components movement and orientation sensors 102, sensor processor 108 and RF Transmitter 202 comprise the physical coin system 400. The sub-components display computer 302, receiver processor 308 and RF Receiver 208 comprise the physical remote station 600. The components may be coupled with one another via data links as per the previous paragraph or in the case of RF Transmitter 202 and RF Receiver 208, a wireless communications link of any type.

Figure 5A:
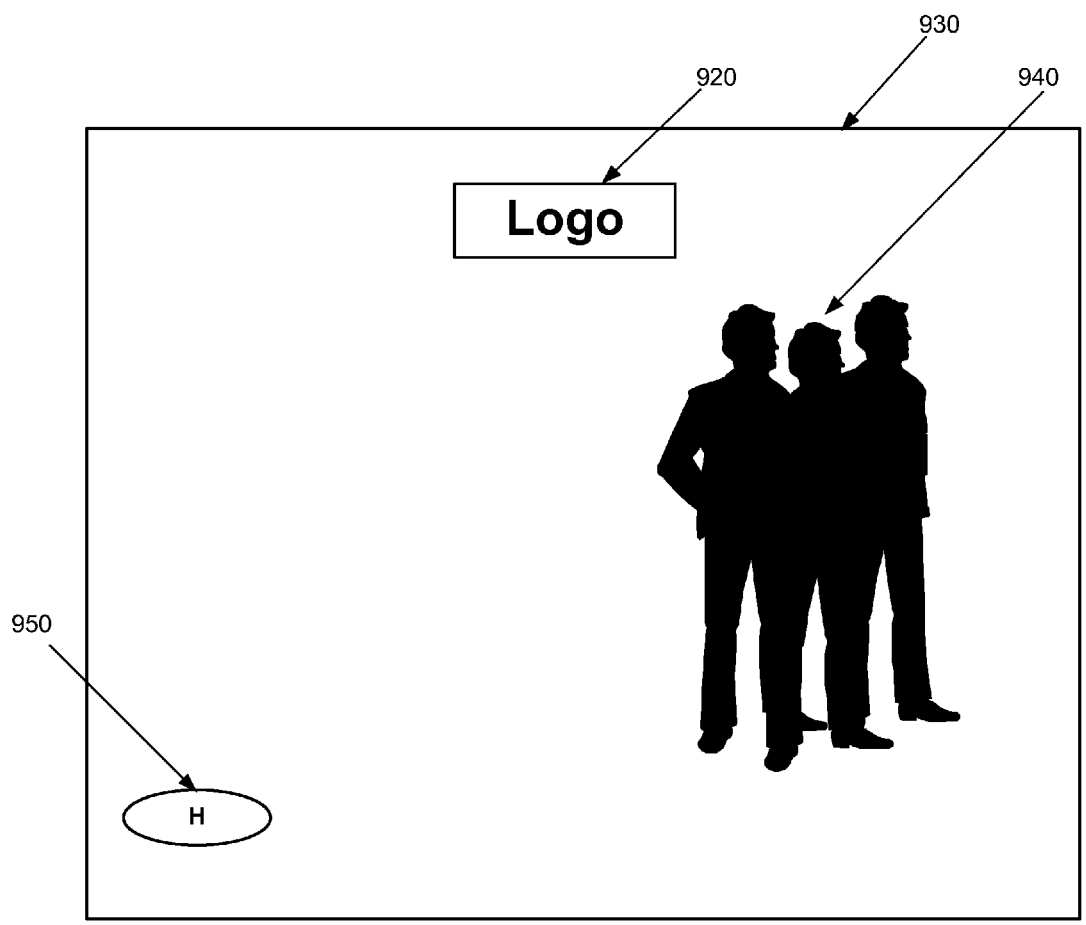
FIG. 5A is a screen illustrating the graphics and video on the viewer display at the beginning of the coin toss.
Figure 5B:
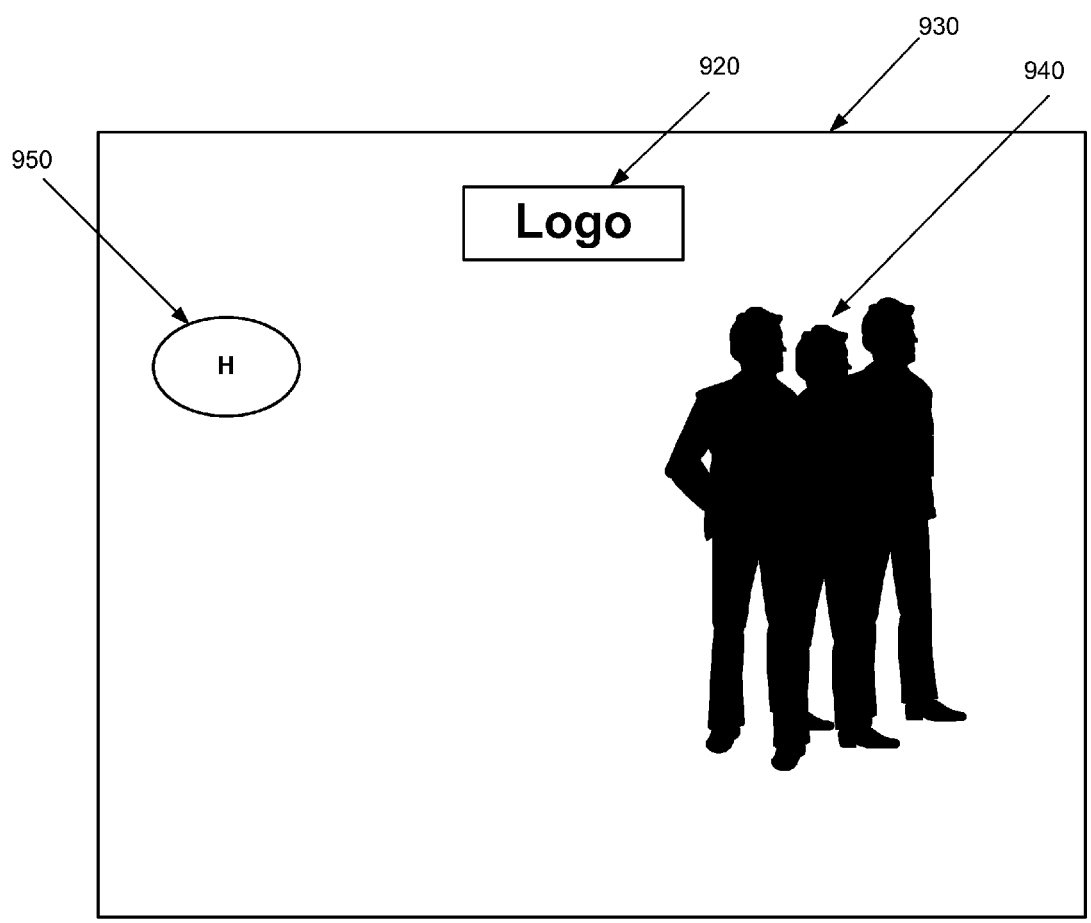
FIG. 5B is a screen illustrating the graphics and video on the viewer display of the coin toss while the coin is in the air.
Figure 5C:
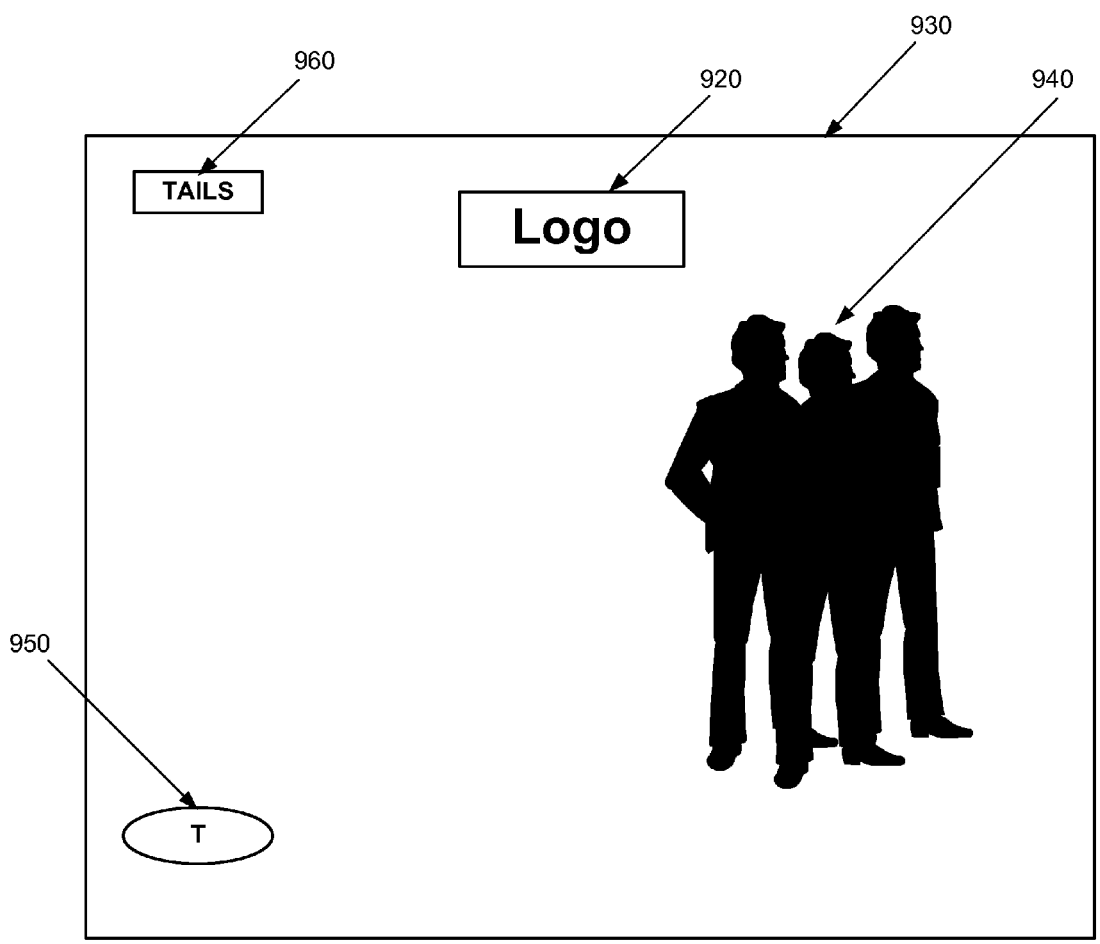
FIG. 5C is a screen illustrating the graphics and video on the viewer display as the viewer is shown the side that is up and is shown the toss call text message.

In one or more embodiments of the invention a graphical coin is displayed to viewers via television, via stadium large screen or via other devices. The following display screens illustrate the view that the viewers see when exposed to this embodiment. The viewer display screen at the beginning of the coin toss may include any of the objects shown in FIG. 5A. The display screen may include a sponsor's logo 920, a border 930, a live action video scene 940, and virtual coin (or graphical coin) 950 at the bottom of the screen. The viewer display screen when the coin utilized in the coin toss is in midair is shown in FIG. 5B. In this embodiment, the virtual coin 950 is shown rising with "heads" "H" mostly facing the viewers. The display screen may also include any of the objects shown in FIG. 5B including but not limited to the sponsor's logo 920, the border 930, the live action scene 940, and the graphical coin 950 vertically displaced on the screen. Any degree of accuracy or scaling may be utilized in displaying the virtual coin in relation to the actual displacement of the actual coin used in the coin toss. The viewer display screen at the end of the coin toss is shown in FIG. 5C. The display screen may include any of the objects shown in FIGS. 5A-5C including but not limited to the sponsor's logo 920, the border 930, the live action scene 940, the graphical coin 950 at the bottom of the screen, and may include the toss call text message 960 which matches the virtual coin 950 that is shown lying in "tails up" or "T" resting position. The graphical coin (and/or other objects) may be shown with a blue background. This allows using blue-screening (special effect) techniques to overlay the coin graphics onto other scenes, such as advertising scenes.

Operation of an Embodiment—FIG. 3A

The logical sub-component block diagram is shown in FIG. 3A. Movement and orientation sensors 102 detect the movement and orientation of the coin during the coin toss. There are many types of sensors that may be utilized in embodiments of the invention. In one embodiment, three-axis accelerometers are utilized, however gyroscopes, light sensors, optical sensors, magnetometers, and/or any other sensors may also be used in singular, multiple and in any combination. Sensor data is output from the accelerometers, and communicated to sensor processor 108 via the connecting data path. The processor performs sensor processing of the raw sensor data to prepare the data for communication via RF Transmitter 202. The sensor processing may include one or more of the following or none.

Interpretation of the sensor data to translate the data into a form more useful to other downstream system components.

Filtering of the sensor data to reduce the effects of random perturbations in the data, fill in missing data and otherwise make the data more representative of coin movement and orientation.

Kinematics modeling of the coin, to allow sparse orientation data to represent the full kinematics of the coin.

Interpretation to determine if the coin condition is in-flight, launch, or captive, and optimize the data for those conditions.

Translating the data into a more compressed form to allow faster communication, reduce communication latency and improve the real-time response of the overall system. Compressing data preserves the material content and reduces the amount of data to be communicated. Decompressing occurs at the remote station to reconstruct the material content.

Once the sensor data is processed by sensor processor 108, the data may be formatted using data communication techniques in preparation for the data to be sent to RF transmitter 202 for radio frequency transmission to RF receiver 208. In this embodiment data communications formatting may include CRC (cyclic redundancy check) data protection information, data framing and Biphase Mark bit encoding. In addition, data encryption may be used to secure the data. The data framing may include adding a preamble of zeros data. Forward error correction (FEC) can be used to add data robustness beyond basic data protection. To mitigate RFI (RF interference) from other RF devices in the vicinity, a frequency-hopping methodology may be used in any of the RF receivers and transmitters utilized in embodiments of the invention. Frequency hopping is known by those skilled in the art. In this embodiment, the formatted data frame is sent to RF transmitter 202 via a data path that may for example be implemented as a serial data path. The RF transmitter uses the formatted data frame to modulate a radio frequency signal. The radio frequency signal may be radiated via an antenna coupled with RT Transmitter 202. The antenna is not shown for brevity however it may be considered to reside internally on the RF transmitter 202. In one or more embodiments, the external housing of the coin may be utilized as an antenna. In order to communicate the data, RF transmitter 202 may be configured and controlled by sensor processor 108 which may perform the necessary configuration and control via a data path. Alternatively, the configuration and control may be communicated over a communications link that is separate from the data path used for the formatted data. RF transmitter 202 as utilized may be an off-the-shelf module available from commercial vendors, such as RF MONOLITHICS® or CHIPCON®. Depending on the module, configuration and control may include, setting the frequency, setting the data rate, setting the modulation technique, and controlling the transmitter output power.

The radiated radio frequency signal is transmitted over a distance and is received by RF receiver 208. In this embodiment, the signal is demodulated and sent as demodulated data to receiver processor 308 via a data path that may for example be implemented as a serial data path. As with RF transmitter 202, RF receiver 208 may be an off-the-shelf module and may be configured and controlled by receiver processor 308 for example. The demodulated data, e.g., the Biphase Mark serial data in this embodiment is detected from noise by the receiver processor. In this embodiment, the sequence of zeros preamble data is detected from noise using a match filter digital technique. Once the preamble is detected, the remainder of the preamble and subsequent data is detected and decoded also using a match filter technique. The decoded data frame may be checked for errors using the data protection information. Erroneous data is thrown away and ignored. FEC may be used to correct erroneous data, rather than throwing the data away. If the date is encrypted, receiver processor 308 may be used to decrypt it. Once processed by the receiver processor, the data frame represents the sensor-derived data frame from the coin. The sensor-derived data is sent to display computer 302 via a data path. In this embodiment, the display computer uses the sensor-derived data from the receiver processor to calculate the coin's movement and orientation and to show a graphical coin that may mimic the movement and orientation of the coin in the coin toss.

Any communication techniques may be utilized in communicating sensor-derived data to the display computer, for example radio frequency, light, infrared, optical or any other type of communication channel. For instance rather than transmitter and receiver, a transceiver could be used at each end and a send/retry technique could be used for data communication. Furthermore, the component utilized to process the data may be lie anywhere within the system, hence the location of data/communication processing as detailed herein may be relocated as one skilled in the art will recognize. For instance, FEC may be performed in sensor processor 108 or in RF Transmitter 202 or in the receiver side of the system for receive side correction.

So that the graphical coin is responsive to the coin toss in real-time, system design for performance and overall latency is a consideration. Accordingly, the time to process the sensor-derived data, transmit the sensor-derived data, receive the sensor-derived data, calculate and display the results may be implemented with any technique that allows for accuracy of the virtual coin flip to the desired level. In one or more embodiments, the sensor-derived data and communication framing is configured to be small, and to employ a communication frame rate that supports the desired real-time responsiveness. For example, in one embodiment a data frame rate of 60 frames per second is used at a baud rate of 38,300 although other frame and baud rates may be utilized to obtain the desired accuracy.

To conclude this section, for the operation of this embodiment any number of any types of sensors may be used, any processing of the sensor information may be performed. Any communication methods, communication mediums, communication frequencies, or any combinations of these may be used.

Figure 6A:
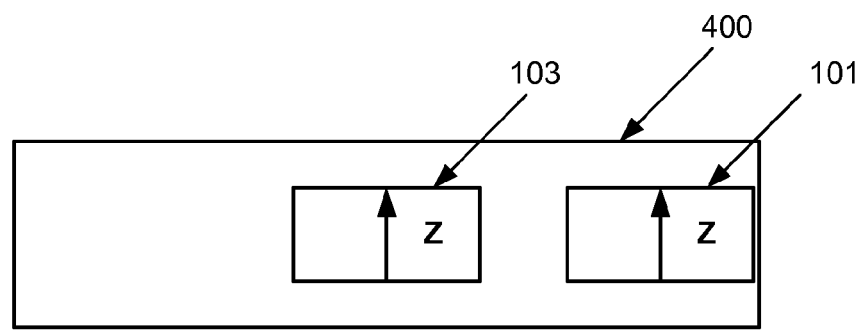
FIG. 6A is a side view of the coin showing the accelerometer positions and the Z-axis of the accelerometers.
Figure 6B:
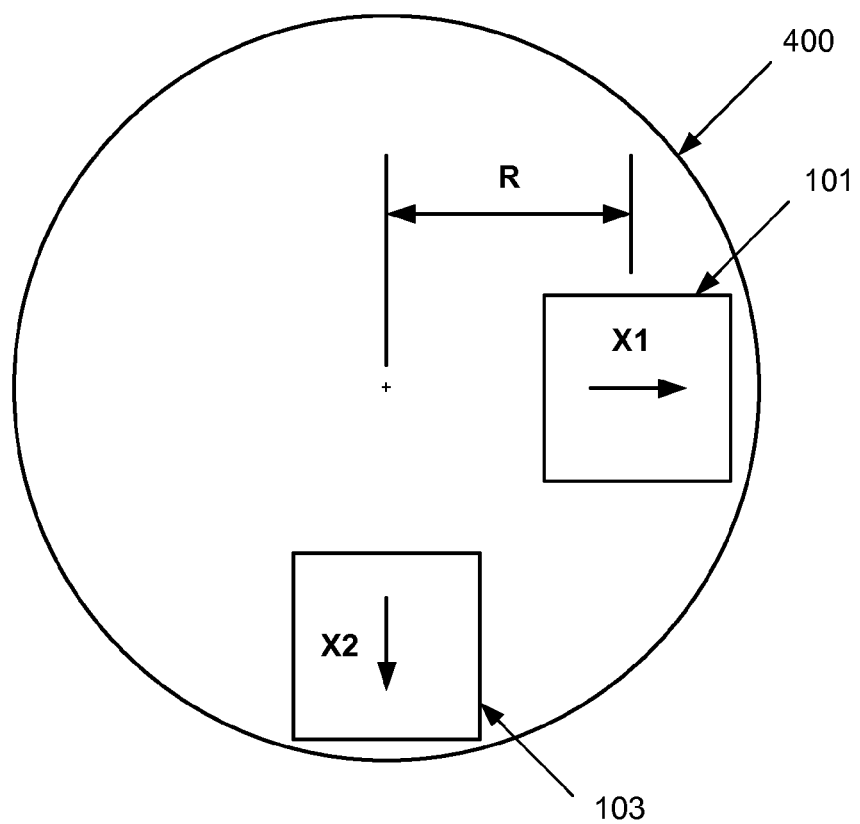
FIG. 6B is a top view of the coin showing the accelerometer positions, the X1-axis of one accelerometer and the X2-axis of the other accelerometer.

Operational Calculations of an Embodiment—FIG. 6A, 6B

The discussion herein is in regards to calculations of parameters and values that may be used to manipulate a graphical coin or its representations.

The coin system side-view (FIG. 6A) shows the Z-axis of one accelerometer 101 and the Z-axis of the second accelerometer 103 in coin sensing system 400. The coin system top-view (FIG. 6B) shows the X1-axis of the coin on one accelerometer 101 and the X2-axis of the coin on the second accelerometer 103. The various axis measure acceleration in the direction of the arrows in the figures. In this embodiment states are used to represent the different conditions of the coin and to process according to the specific condition. Those skilled in the art recognize that in addition to a state-based scheme, there are many other techniques that can be used. In this embodiment, each condition (state) is processed differently to represent the graphical coin on the display. The conditions are the "captive" condition, the "launch" condition, and the "in-flight" condition. During the captive condition the coin is experiencing the force of approximately one gravitational unit (1 G). The captive condition occurs when the coin is in someone's hand or lying on the ground. The coin is in the launch condition when it is experiencing significantly more than 1 G. In other words when it is thrown. The coin is in the in-flight condition when it is experiencing close to zero Gs. In other words it is not touching anything and is in free flight. The condition (state) is determined by measuring Gs that are being exerted on the coin. When the Gs exerted is close to 1 G, then the coin's condition is captive. When the Gs exerted is significantly more than 1 G, then the coin's condition is launch. When the Gs exerted is close to zero Gs, then the coin's condition is in-flight.

During the captive condition, a tilt calculation uses the accelerometers and measures the gravitation force vector and determines the tilt angle (parameter) of the coin. The tilt calculation determines whether the coin is heads-up, tails-up and any angle in between. The calculated tilt angle of the coin may be used to control the graphical coin and draw it at the same angle. The tilt calculation can be seen in the source code listing in the calcAxisTilt( ) method of the Accelerometer class (Listing 1 immediately preceding the claims). During the captive condition, the tilt calculation may provide an accurate indication of the coin's dynamic tilt angle as the coin is moving in the referee's hand. If a gyroscope is added, then the accelerometer based tilt angle can be used to align the gyroscope in the captive condition. The dynamic tilt control of the graphical coin results in tilt movements that are realistic and accurate. The precision and realism of the graphical coin may mimic the actual coin, may give the audience a realistic, virtual presentation of the coin's movement both in the referee's hand and on the ground. In one or more embodiments, the graphical representation may be more realistic and accurate when it is most critical, before the coin is tossed and after the coin lands.

During the launch condition the force on the coin is in excess of 1 G. During launch an estimation of the coin's displacement (VDIS parameter) may be based on the acceleration during the throw. There is a VDIS calculation for the launch condition. The coin's rotational velocity (RVEL) may be fixed at zero during launch.

The VDIS calculation during launch uses the acceleration measured during the referee's throw of the coin. In the embodiment, the acceleration during the throw is in excess of the normal 1 G resulting from gravity. The acceleration during the throw may be measured by the Z-axis of the accelerometers (FIG. 6A, 101, 103). The VDIS calculation may use integration of acceleration over time based on Newtonian Physics and can be seen in the source code in the calcDisplacement( ) method for the Launch class (Listing 2 A immediately preceding the claims). Of particular interest in the listing is the deltaV calculation that uses (integrates) relative acceleration from the accelerometers and time. The graphical coin's displacement may be determined via this VDIS calculation. Thus the graphical coin's displacement may representative of the actual coin's displacement during launch but may be scaled or translated in any manner during presentation to fit the screen utilized in displaying the coin toss for example.

During the in-flight condition with the gravitational force on the coin close to zero, in embodiments configured with only accelerometers as sensors, the coin's tilt is difficult to exactly determine. However, the coin's spatial position (displacement) and rotational velocity can be estimated. The in-flight condition may be very dynamic and fast moving, and the people watching the actual coin may not be able to tell its exact movements. An estimation of the coin's displacement (VDIS parameter) and rotational velocity (RVEL parameter) is sufficient for realism. There may be two calculations for the in-flight condition, the calculation for VDIS and the calculation for the coin's RVEL.

The VDIS calculation during in-flight may use a constant, i.e., the acceleration due to gravity. The VDIS calculation may use the integration of acceleration of gravity over time, and may be based on Newtonian Physics for example as can be seen in the source code in the calcDisplacement( ) method for the Launch class (Listing 2B immediately preceding the claims). Of particular interest in the listing is the deltaV calculation that uses the gravitational constant G_METERS_PER_SEC2 of 9.81 meters/sec/sec and integrates it over time. The graphical coin's displacement may be determined via this VDIS calculation. Thus the graphical coin's displacement may be representative of the actual coin's displacement during flight.

The RVEL calculation for the in-flight condition may use the measured acceleration of the coin's rotation to estimate rotational velocity. The combination of the coin's X1-axis and X2-axis accelerometers (FIG. 6B, 101, 103) may be used to measure rotational acceleration. The combination of accelerometers is used in this embodiment, since the exact axis of rotation may be dynamically changing during the in-flight condition. Any number and types of internal sensors may be used. The RVEL calculation may also be based on Newtonian physics and can be seen for example in the source code in the getRotationRate( ) method in the Accelerometer class (Listing 3 immediately preceding the claims). The radius (FIG. 6B, R) from the center of rotation is related to acceleration and may be used in the calculation. The graphical coin's rotational velocity may be determined via the RVEL calculation. Thus the graphical coin's rotational velocity may be representative of the actual coin's rotational velocity.

In embodiments that employ a gyroscope coupled with the coin, the RVEL calculations may be more precise than the estimates for RVEL. In these embodiments, the gyroscope may provide accurate rotational velocity. The gyroscope may provide instantaneous coin angle information similar to the roll, pitch and yaw angles provided by a gyroscope in an airplane for example.

To conclude this section, for the operational calculations any formula or technique may be used to determine any number of parameters or values based on the sensing information from any number of any types of sensors.

Operational Graphical Display of an Embodiment

The display of the graphical coin may be performed using three-dimensional (3D) graphics techniques. Only the high-level principles used in this embodiment are described herein as one skilled in the art will recognize that any type of computer language or drawing technique may be utilized to display the virtual coin in any desired manner. In one embodiment, a scene is created, which contains a flat surface that represents the ground. A light source is created to provide light on the scene, similar to the sun or other overhead lighting. A proportionally accurate wire-frame model of the coin is created. The coin is rendered as solid shape and a bitmap image of the heads side on a real coin is "pasted" onto the heads side of the graphical coin. A bitmap image of tails on a real coin is "pasted" onto the other side of the graphical coin. The coin is positioned above the ground surface and below the overhead light source. A view port is created to set the viewing position in the scene. The view port can be considered the virtual camera position as if a camera was being used. The result of the created scene is that realistic 3D coin is positioned over the ground surface with a camera view. Many other scenes, many graphic techniques, any level of realism, and any representation of the coin may be used.

In addition to rendering the graphical coin with images of a real coin, many other images and imaging techniques can be used for rendering. The imagines used can enhance advertising, such as having an automobile on the heads side of the coin and a company logo on the tails side. The coin can also be rendered with moving images where each side of the coin is rendered with animated clips, video clips or even live video. The graphical portion of this invention can be tailored and evolved to meet the changing needs of commercial usage and satisfy audience demand for stimulating new experiences. As previously discussed, human images such as celebrity faces and reverse angle views of one or more persons may be utilized along with or in place of any other object or item that may be viewed and which may be utilized to represent the outcomes of a coin toss.

In this embodiment, 3D graphics transforms may be used and dynamic coin movements may be added to the scene. In this embodiment, the coin movements may be controlled using two transforms. One transform, the displacement transform, controls the coin's displacement (example: height above the ground surface). The other transform, the rotation transform, controls the coin's rotation angle. In addition the view port may be changed to give the best view of the coin toss, similar to a cameraman panning and zooming to get the best view of a scene. Additionally the graphical coin may be scaled to grow or shrink the size of the coin. Any graphics technique and combinations of operations may be used to manipulate the graphical coin.

During the coin's captive condition, using the displacement transform the displacement may be held relatively constant above the ground surface, at a height similar to being held in a person's hand. During the captive condition, the tilt calculation discussed above is processed and passed to the rotation transform in the form of rotation angles. As a result the coin may be suspended at a relatively fixed height over the ground surface and may rotate practically in unison with the actual coin. If the actual coin is flat with heads up, the graphical coin may be flat with heads up. If the actual coin is heads up tilted 30 degrees, the graphical coin may be heads up tilted at close to 30 degrees. If the actual coin is flat with tails up, the graphical coin may be flat with tails up.

During the coin's in-flight condition, the displacement transform and the rotation transform may both manipulated rapidly and dynamically to control the graphical coin. The VDIS calculation discussed above may be passed to the displacement transform to control the coin's displacement as a result of the toss. During the actual toss the graphical coin may move upward similar to the height of the toss. Once maximum height is reached, the graphical coin may fall toward the ground and may stop approximately when the actual coin hits the ground. Once on the ground the graphical coin goes to the captive condition and may be displayed in 3D as discussed in the previous paragraph. During the coin's in-flight condition in parallel with the displacement, the RVEL calculation may be processed into a series of progressive rotation angles and may be passed to the rotation transform. The series of rotation angles change quickly, slowly or not at all depending on the value of RVEL. The result is the graphical coin may rotate quickly, slowly, or not at all and may be an estimate of how the actual coin rotates. Since the displacement transform and rotation transform are being manipulated nearly in unison, during the in-flight condition the graphical coin may appear to be displaced and rotating (flipping) at the same time. The visual effect is that the in-flight behavior of the graphical coin may be perceived to be similar to the in-flight behavior of actual coin.

In embodiments that employ a gyroscope coupled with the coin, the rotation angles passed to the rotation transform may be more precise than an estimate and may reflect the instantaneous angles of the tossed coin. Thus with a gyroscope the graphical coin's in-flight rotation may reflect the rotation of the tossed coin to any required accuracy and may be synchronous with the rotation of the tossed coin.

Once the coin hits the ground and the condition is captive, the graphical coin's rotation (tilt) angle may accurately reflect the actual coin's angle to any required precision. For example, if the actual coin lands on a surface that is not entirely flat, i.e., the coin lands somewhat non-level, then the virtual coin may be displayed as completely level or at the actual angle of the coin, or from any viewpoint where the resulting heads or tails may be viewed. On the ground, the heads-up/tails-up state of the graphical coin may reflect the heads-up/tails-up state of the actual coin.

In addition to the aforementioned aspects of this invention, audio may be incorporated into the effects of the coin toss. For instance, an audio sound could represent the speed of rotation while in flight based on the RVEL calculation. Another audio sound could represent the displacement of the toss based on the VDIS calculation. Yet another audio sound could represent the coin landing on the ground. Another sound such as a "ping" may be utilized to represent the referee's initial strike of the thumb against the coin at the initiation of the toss.

Yet another addition to aforementioned aspects of this invention, pseudo random number seeding and generation can be incorporated into the coin toss event. Data values such as the coin's height, rotation rate, time from toss to landing, or raw data from the sensors can be used to seed and generate a pseudo random number. Since many of the coin's data values are random in nature, the random number generated by a coin toss will be less likely to be biased. For instance the height of any coin toss is unlikely to be same as any other coin toss, thus height is a good random seed. Many other data values or data sequences for the coin are also not likely to repeat. The practically unbiased random number from a coin toss can be used to engage the coin toss viewer in games of chance. For instance in the stadium the coin toss can be used to select a certain seat in the stadium that will win a prize. Also the stadium viewer's ticket can have a head's or tails printed on it that is selected by the viewer when the ticket is purchased. If the viewer makes the same call as the coin toss, then a prize can be awarded appropriately.

To conclude this section, for the operation of the graphical display any technique may be used to make the graphical coin or its representation appear to move in response to any calculated parameters or values based on the sensing information from any number of any types of sensors.

Figure 7:
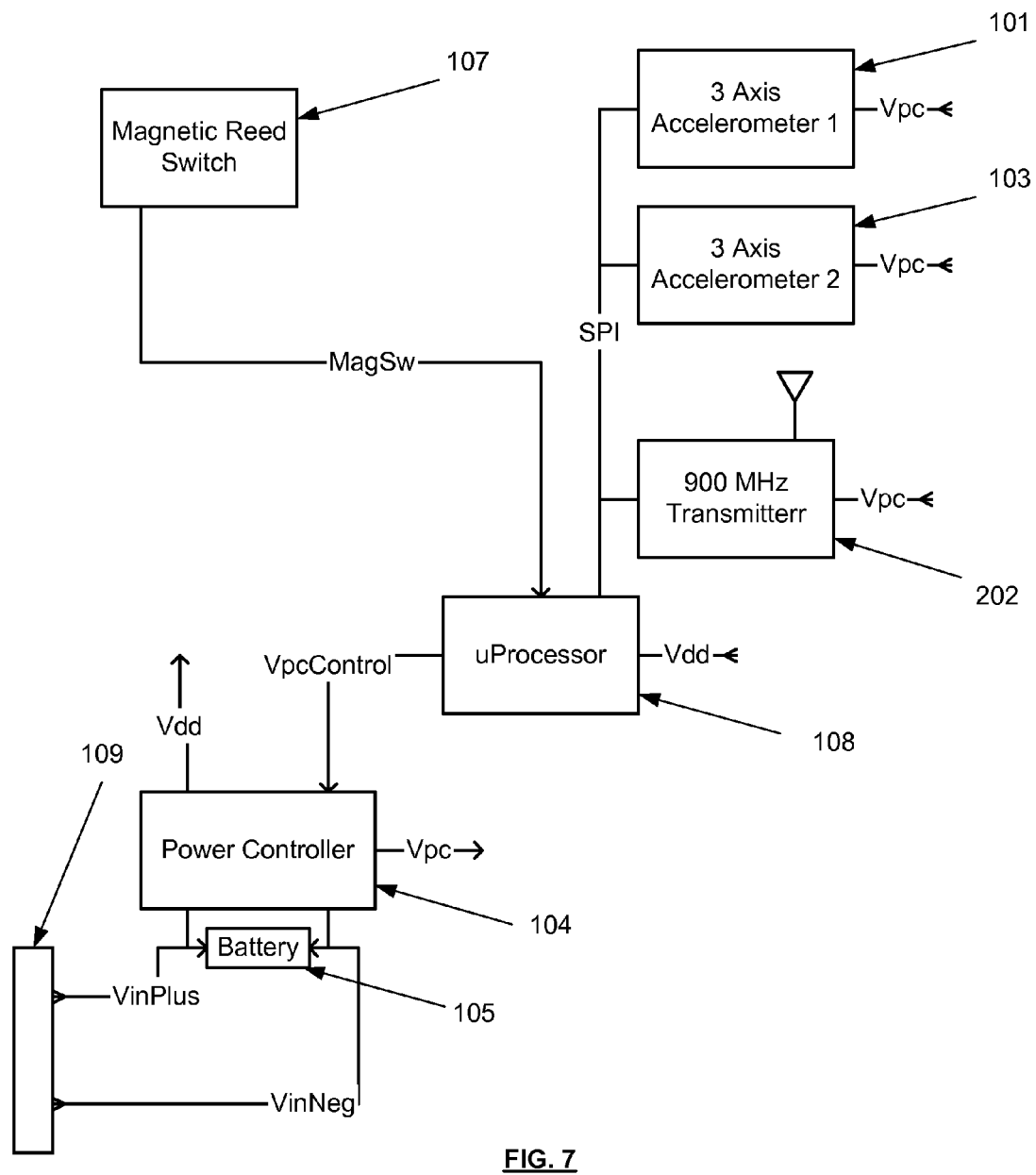
FIG. 7 is a block diagram of the electronic circuitry and electrical connections of the coin.

Coin Electronic Circuit of an Embodiment—FIG. 7

The block diagram FIG. 7 shows an embodiment of the invention shown with specific implementations of the general components discussed elsewhere which are not intended to be limiting values as other arrangements are within the spirit of the invention. Sensor processor 108 is implemented as a uProcessor (microprocessor). Accelerometers 101, 103 are implemented as SPI (Serial Peripheral Interface standard) bus controlled 3 axis accelerometers. RF transmitter 202, is implemented as a SPI controlled transmitter with antenna in the 900 MHz (megahertz) band. Other frequency bands can be used depending on the location of transmission (the locality where the coin is being tossed). The power control components include the magnetic reed switch 107, power controller 104, the rechargeable battery 105 and the power-input contacts 109.

The uProcessor controls and exchanges data with the Accelerometers and Transmitter via the SPI bus.

The operation of the power control components contributes to the practical use of the invention. The power-input contacts provide electrical contacts on the outside of the coin enclosure so that external power supplied can charge the battery via the VinPlus and VinNeg lines. The Power Controller 104 takes battery input voltage and outputs regulated Vdd voltage to the uProcessor. When controlled via VpcControl, the Power Controller outputs regulated Vpc voltage to the Accelerometers and Transmitter. When near a magnet, the magnetic reed switch signals the uProcessor via the MagSw line. Then the uProcessor will turn off Vpc via the VpcControl line, which turns off the transmitter and accelerometers. Connection with the power-input contacts supplies power so that the battery 105 is charged. Any other power input, power control, battery management, or battery charging techniques may be utilized.

Figure 8:
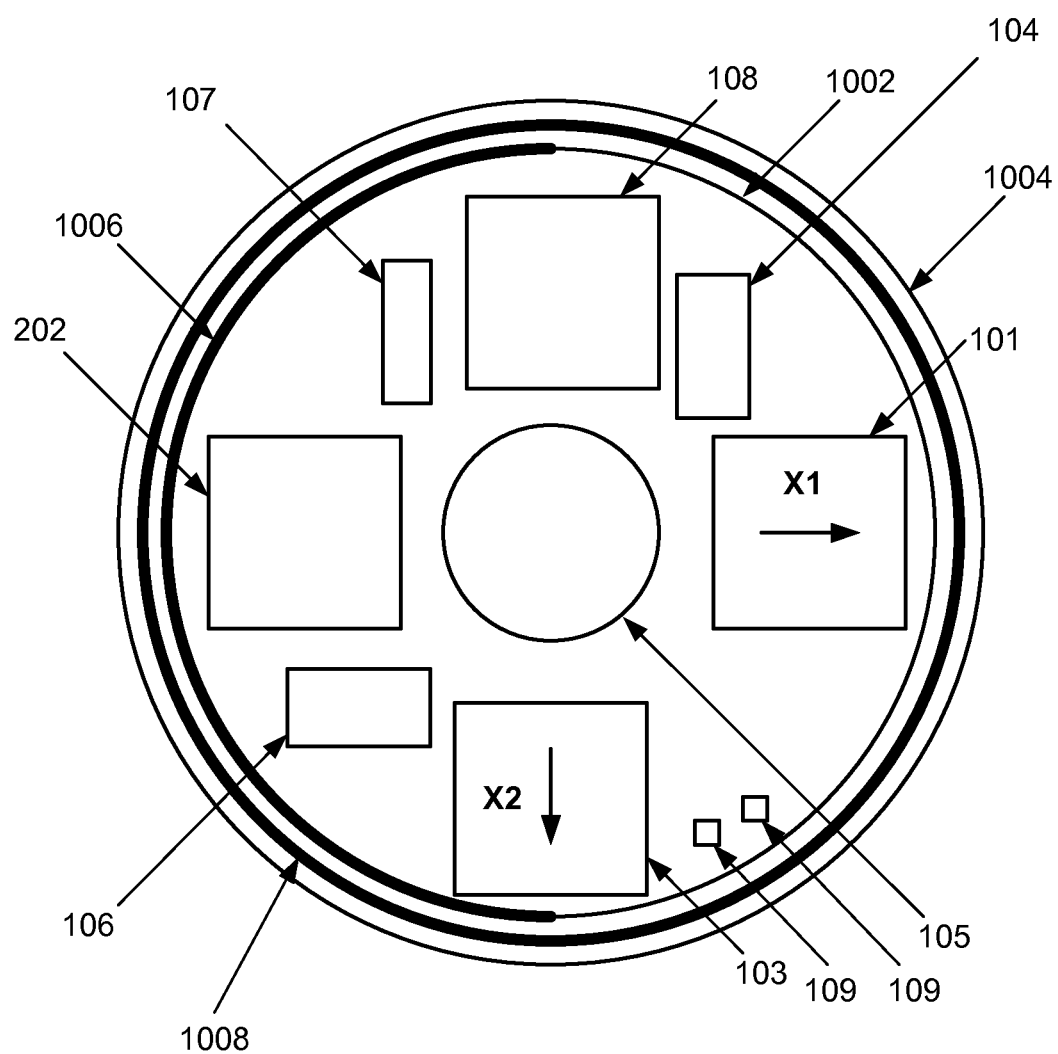
FIG. 8 is a mechanical drawing of the physical enclosure and the printed circuit board of the coin.

Physical Construction of an Embodiment—FIG. 8

The enclosure 1004 of an embodiment of the invention provides mechanical and environment protection for the coin's printed circuit board 1002. The enclosure provides space for the circumferential weight 1008 that provides balancing and to give the coin a feel and weight similar to that of a real coin or any desired weight. The enclosure allows RF radiation from the internal antenna 1006 and provides mechanical support of external power-input contacts 109. The material used for the enclosure in this embodiment is plastic although any other type of material that allows for the communication of sensor-derived data from the coin is in keeping with the spirit of the invention. The housing may be any size and shape desired.

The electronic components are laid out on the circuit board to give the fabricated circuit board (with components mounted) a balanced weight distribution. In this embodiment the components (discussed elsewhere) are laid out as shown in FIG. 8. Any layout that provides for a coin that is balanced enough to rotate when tossed may be utilized.

Figure 9:
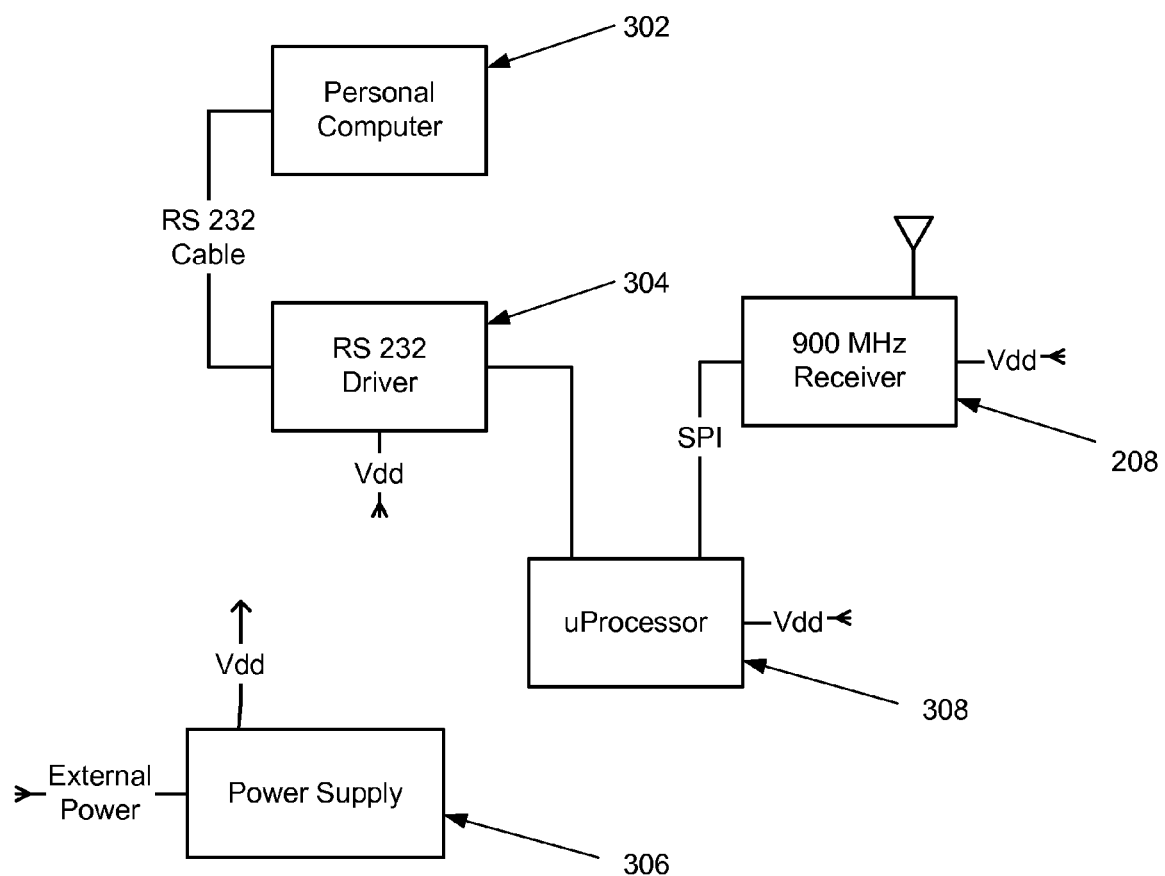
FIG. 9 is a block diagram of the electronic circuitry and electrical connections of the receiver with connection to the display computer.

Receiver Electronic Circuit of an Embodiment—FIG. 9

The block diagram FIG. 9 shows an embodiment of the invention shown with specific implementations of the general components discussed elsewhere which are not intended to be limiting values as other arrangements are in keeping with the spirit of the invention. Receiver processor 308 may be implemented as uProcessor (microprocessor) or any other type of processing unit. RF receiver 208 may be implemented as a SPI controlled 900 MHz receiver with antenna in the 900 MHz band for example. Display computer 302 may be implemented as a Personal Computer (PC) as shown or workstation or integrated computing device in a broadcast trailer for example which allows for the integration of other video with the display of the virtual coin. RS 232 driver 304 allows uProcessor 308 to interface via a standard RS232 communications port on PC 302. Power supply 306 provides regulated power to the receiver electronic components as per the Vdd input lines to driver 304, receiver 208 and uProcessor 308.

UProcessor 308 controls and exchanges data with 900 MHz Receiver 208 via the SPI bus (shown as SPI line coupling receiver 208 with uProcessor 308). UProcessor 308 exchanges data with PC 302 via the connection to RS232 Driver (connection shown as the RS232 Cable). The Power Supply inputs external power and outputs regulated power that is distributed via the Vdd lines. Any other serial or parallel communications protocol besides RS232 may be utilized depending on the particular installation including more robust communications links that may be utilized in noisy environments for example.

Description of the Extended Range Embodiment—FIGS. 1B, 2C, 4A, 4B

Figure 1B:
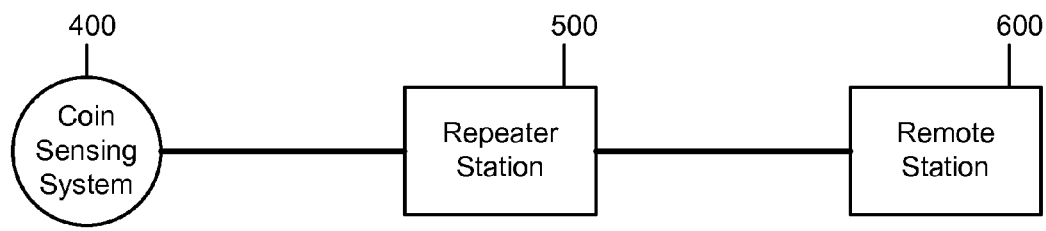
FIG. 1B is a block diagram illustrating the sensing and communication between three physical components of the extended range embodiment of this invention, the coin sensing system, the repeater station and the remote station.
Figure 2C:
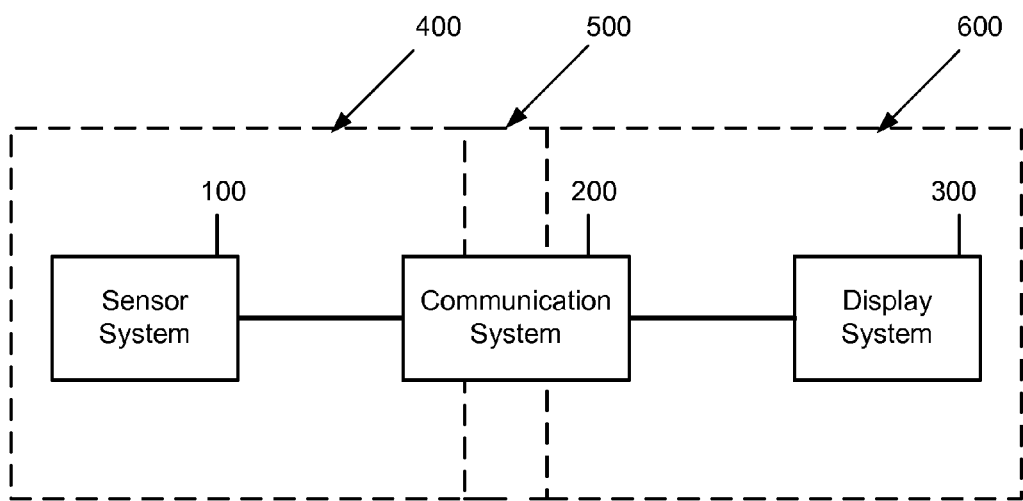
FIG. 2C is a block diagram illustrating how the logic components, the sensor system, the communications system and the display system are contained in the physical system of the extended range embodiment (coin sensing system, repeater and remote station).

The components comprising the physical system of the extended range embodiment of the present invention are illustrated in the block diagram of FIG. 1B. The coin sensing system 400 is connected to the repeater station 500 via a communication link. The repeater station 500 is connected to the remote station 600 via a communication link. The components comprising the logical system of this embodiment of this invention are illustrated in the block diagram of FIG. 2A. The sensor system 100 is connected to the communication system 200 by a data path. The communication system is connected to the display system 300 by a data path. FIG. 2C illustrates how the logical components are distributed amongst the physical components in this embodiment of this invention. The sensor system and part of the communication system are contained in the coin system 400. Part of the communication system is contained in the repeater station 500. The display system and part of the communications system are contained in the remote station 600.

Figure 4A:
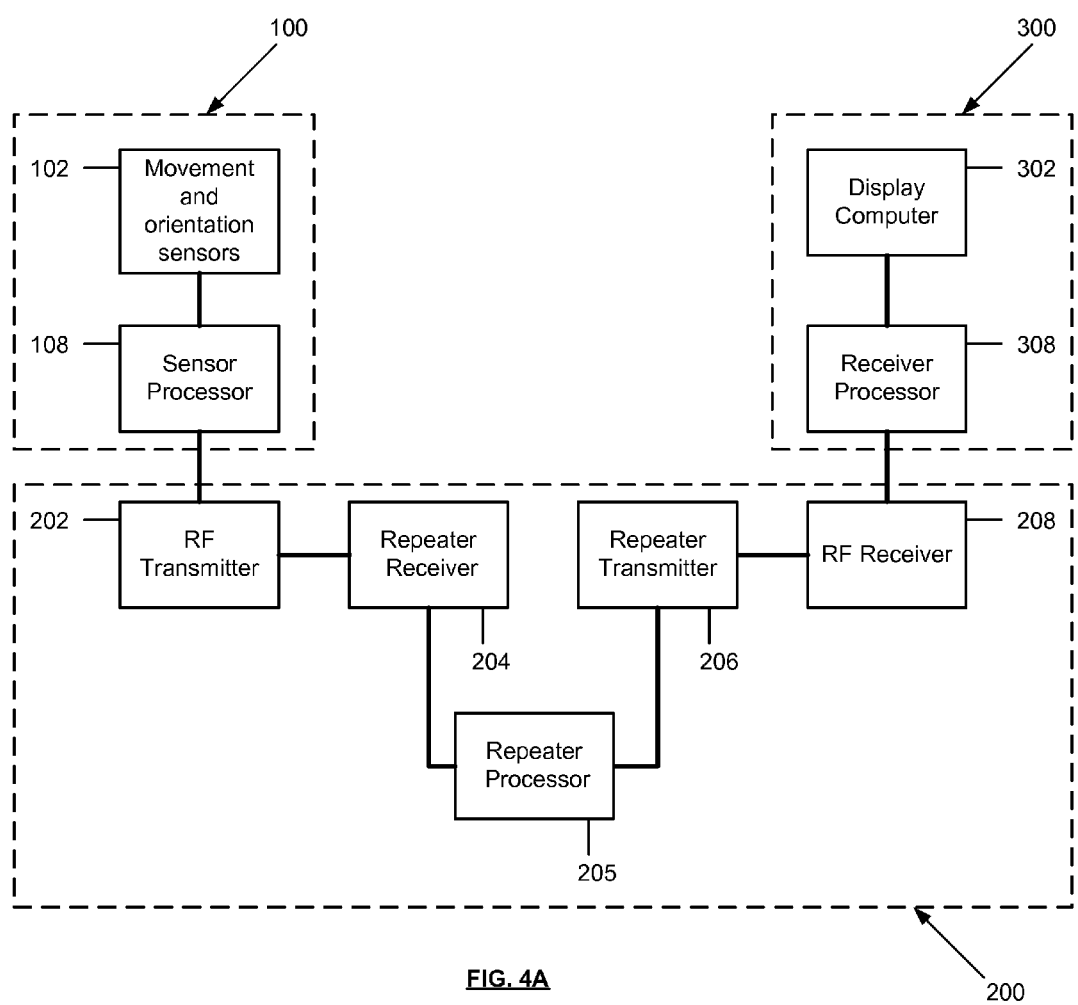
FIG. 4A is a block diagram illustrating the logical components of the extended range embodiment divided into logical sub-components.

FIG. 4A illustrates the logical sub-components that comprise the logical components. The sensor system component 100 includes sub-components movement and orientation sensors 102 and sensor processor 108. The movement and orientation sensors are connected to sensor processor 108 via a data path. The communication system component 200 is comprised of sub-components RF transmitter 202, repeater receiver 204, repeater processor 205, repeater transmitter 206, and RF receiver 208. The sensor processor is connected to the RF transmitter via a data path. The RF transmitter is connected to the repeater receiver via a radio frequency (RF) communication link. The repeater receiver is connected to the repeater processor via a data path. The repeater processor is connected to the repeater transmitter via a data path. The repeater transmitter is connected to the RF receiver via a radio frequency (RF) communication link. The display system component 300 includes display computer 302 and receiver processor 308. The display computer and receiver processor are connected via a data path. The receiver processor is connected to the RF receiver via a data path.

Figure 4B:
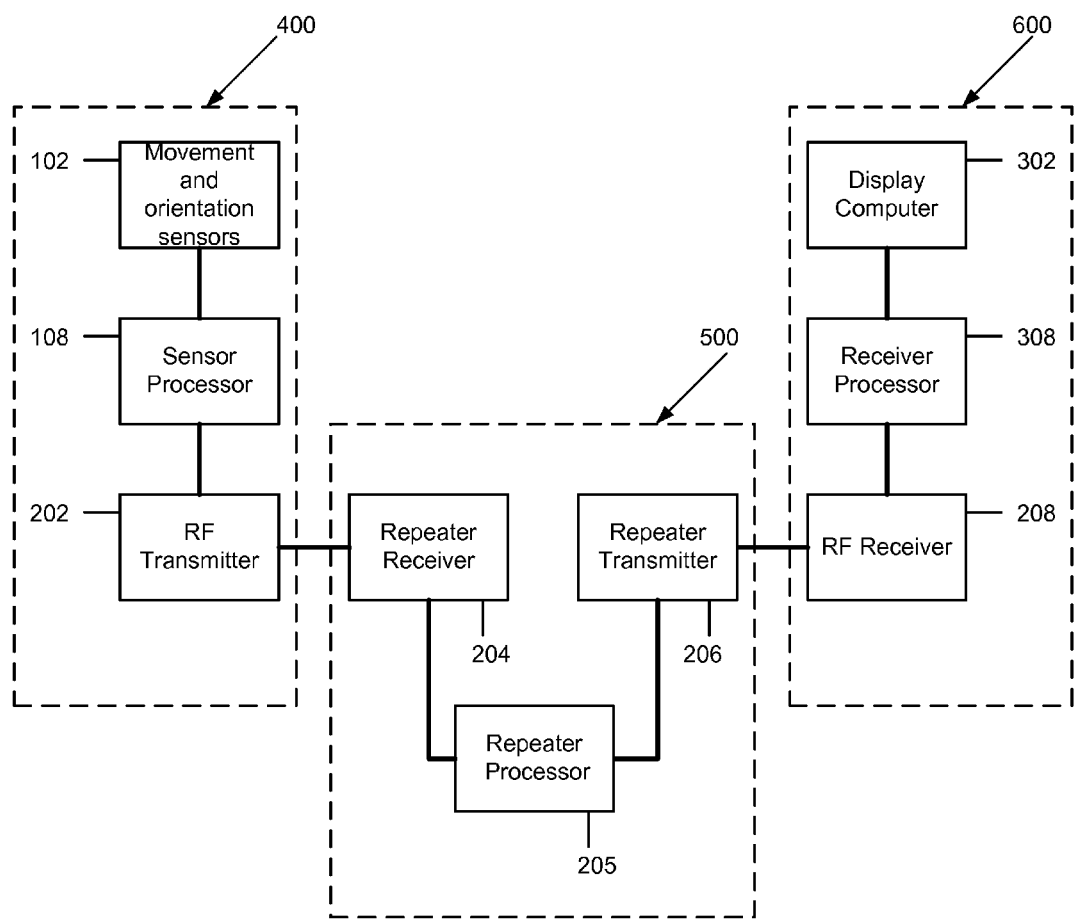
FIG. 4B is a block diagram illustrating how the logic sub-components, are contained in the physical system of the extended range embodiment.

FIG. 4B illustrates how the logical sub-components are distributed amongst the physical components in this embodiment of this invention. Sub-components movement and orientation sensors 102, sensor processor 108 and RF transmitter 202 comprise the physical coin system 400. The sub-components repeater receiver 204, repeater processor 205, and repeater transmitter 206 comprise the physical repeater station 500. The repeater station may have other sub-components in addition to those mentioned. For instance user interactive sub-components, such as LED's and buttons to allow user interactions, may be used. Sub-components display computer 302, receiver processor 308 and RF receiver 208 comprise the physical remote station 600.

Operation of the Extended Range Embodiment—FIGS. 1B, 4B

The operation of the extended range embodiment may be similar to the operation of other embodiments, except with regard to the communications between the RF transmitter 202, FIG. 4B and the RF receiver 208. In this embodiment, the radiated radio frequency signal from the RF transmitter is transmitted over a distance and is received by the repeater receiver 204. The repeater receiver is tuned to the same frequency as the RF transmitter. The repeater receiver demodulates the RF signal. The repeater processor 205 decodes the repeater receiver's demodulated signal, similar to the receiver processor decoding described in an embodiment. Using the decoded data, the repeater processor frames the data similar to the sensor processor described in an embodiment. The framed data is sent to the repeater transmitter 206 to modulate a RF output signal. The repeater transmitter may transmit on a different frequency than the RF transmitter 202. The radiated radio frequency signal from the repeater transmitter is transmitted over a distance and is received by the RF Receiver 208. The RF Receiver 208 is tuned to the same frequency as the Repeater Transmitter 206. Thus the repeater receives on one frequency and may transmit (repeat) on another frequency.

The Repeater Receiver and the Repeater Transmitter are contained in the repeater station 500. The repeater station is able to be physically larger than the coin system 400. The larger size allows for a higher power system, higher RF power output and a larger antenna. The repeater transmitter can therefore have more effective radiated RF output power and may have longer range than the coin system. The repeater station 500 may be used on the playing field in close proximity to the coin toss. This close range allows the relatively weak RF transmitter in the coin system to be more easily received by the repeater station. The higher power repeater transmitter may be better able to transmit at longer range to the RF receiver that may be off the playing field.

The repeater station may also serve as a place to put the coin when the coin is not being tossed. The repeater station may also serve as a charger for the coin systems internal battery. The coin system's relatively low capacity battery may be charged from the higher-capacity repeater station battery. The repeater station may have additional capabilities such as, but not limited to, a display and input device for user interaction.

To conclude this section, for the extended range embodiment, any communication methods, communication mediums, communication frequencies, or any combinations of these may be used to extend range. Any processing of the data may be performed or none.

Figure 1C:
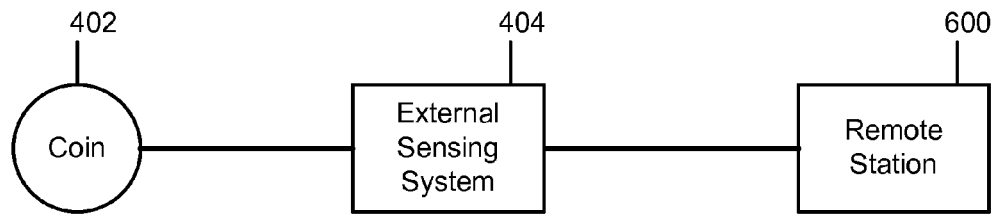
FIG. 1C is a block diagram illustrating the sensing and communication between three physical components of the external sensing embodiment of this invention, the coin, the external sensing system and the remote station.
Figure 2D:
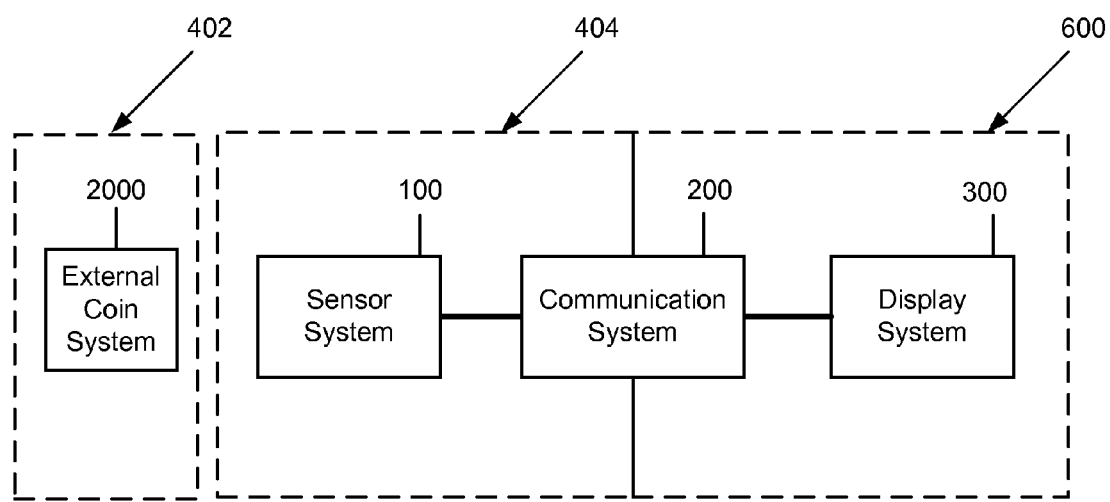
FIG. 2D is a block diagram illustrating how the logic components, the sensor system, the communications system and the display system are contained in the physical system of the external sensing embodiment.

Description of the External Sensing Embodiment—FIGS. 1C, 2A, 2D

The components comprising the physical system of the external sensing embodiment of the present invention are illustrated in the block diagram of FIG. 1C. Coin 402 is sensed by the external sensing system 404 via a sensing path. The sensing path can be a visible path for optical sensing, a laser path for laser sensing or a path of another type for example a magnetic path for magnetic sensing. The external sensing system connected to the remote station 600 via a communication link. The components comprising the logical system of an embodiment of this invention are illustrated in the block diagram of FIG. 2A. The sensor system 100 is connected to the communication system 200 by a data path. The communication system is connected to the display system 300 by a data path. FIG. 2D illustrates how the logical components are distributed amongst the physical components in this embodiment of this invention. The coin system 2000 is contained in the physical coin 402. The sensor system and part of the communication system are contained in the external sensing system 404. The display system and part of the communications system are contained in the remote station 600.

Operation of the External Sensing Embodiment—FIGS. 1C, 2D

The sensor system 100, FIG. 2D uses means such as an imaging system similar to a video camera, laser scanning, or infrared sensors to sense the external coin system 2000. The coin system may be an actual coin or may be a coin-like object with or without passive features that enhance the external sensor's recognition. Passive features such as reflectors, pattern coding, such as bar coding, or coloring may be used. The coin-like object may have active features, such as LEDs (light emitting diodes), infrared emitters or other emitters that enhance recognition. The emitters may transmit in a steady state, may transmit codes or patterns for recognition, or may transmit data to provide information about the coin object or its movement. The passive and/or active features may be used singularly or in combination. Using enhancement features or no enhancement features, the sensor system detects coin movements externally and processes the coin's movements into orientation and spatial position (displacement) data. The orientation and position data are sent via the communication system 200 to the display system 300. The display system processes the data and displays a graphical coin that moves in accordance with the coin system.

Any image-processing algorithm or algorithms configured to recognize and track a coin from a sequence of images (image frames), for example taken from above, may be utilized. For the image processing discussion below, the images are taken from above, the coin's faces have different colors, and each face color contrasts with the normal background color. When the coin is tossed, the coin's position in the image frame sequence may be tracked using techniques such as "Kalman tracking of color objects" in U.S. Pat. No. 6,917,692 to Murching et al., filed on May 25, 1999. Another tracking technique is described in U.S. Pat. No. 7,187,783 to Moon et al., filed on Dec. 27, 2002. Using the frame position determined via tracking, the coin's outline may be detected from the background by image processing algorithms such as Circle Hough Transform (CHT), it's derivatives, Fast Circle Detection (FCD), or other techniques for real-time circle or ellipse detection. One ellipse detection technique is described in U.S. Pat. No. 5,189,711 to Weiss et al., filed on Sep. 9, 1991. The detected outline of the coin may change as the coin moves. If the outline is a circle then the coin may be determined to be in a near flat orientation. If the outline is ellipse shaped, then the ratio of the major and minor axis of the ellipse may determine the coin's tilt angle. If the outline is a line (degenerate ellipse) then the coin may be determined to be in a vertical (edge up) orientation. A formula written in Java for calculating tilt angle given the axis ratio minor divided by major is shown in Listing 4. To resolve an ambiguity, the prior tilt angle is an input argument. The calculated tilt angle closest to the prior tilt angle can be used and the other ambiguous tilt angles can be eliminated. Based on image frame rate, determining how fast the shape changes from a circle to a line may be used to determine the coin's rotational velocity. A formula written in Java code for calculating rotational velocity (RVEL) is shown in Listing 5. The input argument numberOfFrames represents the number of frames that occurs between the coin outline shape changing from a circle to a line. Which side is up when the coin is oriented near flat may be determined by image processing. For instance, detecting which of the two face colors (as described above) inside the coin's outline may be used to determine which coin face is up. Other techniques such as texture recognition may also be used to determine the coin's face up orientation. In a paper titled "Coin Recognition using Vector Quantization and Histogram Modeling" authors Seth McNeill, Joel Schipper, Taja Sellers, Michael C. Nechyba describe such a technique. Determining the coin's displacement (VDIS) given the known height of the overhead camera may be accomplished by calculating the range from the camera. U.S. Pat. No. 5,867,256 to Van Rheeden, filed on Jul. 16, 1997 describes a method of range estimation using image size measurements. Any of these algorithms, or any other algorithm for determining the orientation of a coin may be utilized in external sensing embodiments of the invention.

Thus using image processing techniques, coin movement and orientation can be determined. Heads or tails up (face up) can be determined, the coins tilt angle can be determined, displacement (VDIS) can be determined, and rotational velocity (RVEL) can be determined. Like the gyroscope implementation discussed in another embodiment, the instantaneous coin angle information can also be determined. Using these parameters, the graphical coin may be manipulated as described in another embodiment and as in another embodiment the graphical coin may mimic the tossed coin. Similar to another embodiment the graphical coin can reflect the tossed coin as an estimate, exactly, or a combination of the two.

For the external sensing embodiment, the coin may have any active feature, any passive feature or any combination or multiple of these for external sensing. The features may be external or internal to the coin. Any processing of the sensor information may be performed. Any calculations, any formula or technique may be used to determine any number of parameters or values based on the sensing information from any number of any types of sensors.

The General Embodiment—FIG. 2A

In one or more embodiments of the invention sensing a coin's orientation and spatial position (displacement) during a coin toss occurs using any method or means, for example using sensor system 100. Likewise, data from the sensor system may be communicated using any method or means via the communication system 200 to the display system 300. The display system for example receives and using any method or means, interprets the data from the sensor system and displays a graphical coin that may mimic the actual coin. The graphical coin virtually represents the actual coin toss. The resulting virtual coin toss is shown to viewers. The virtual coin toss can be used for commercial purposes.

Figure 10:
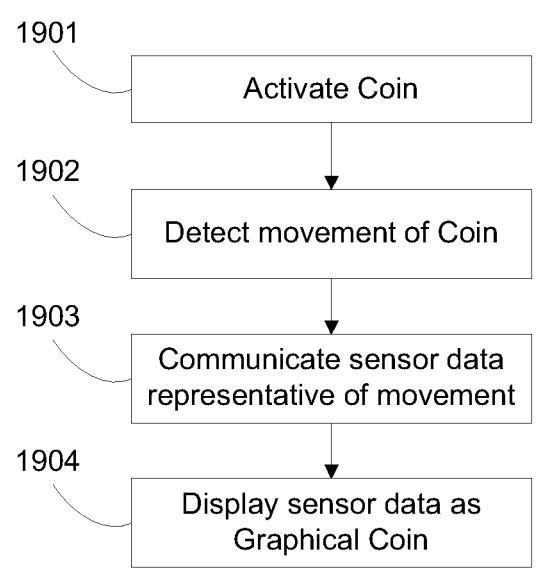
FIG. 10 shows an embodiment of a method utilized in graphically displaying a coin toss.

An embodiment of a method utilized in graphically displaying a coin toss is shown in FIG. 10. Processing includes activating an instrumented coin at 1901 wherein the activation of the coin enables the coin to transmit movement data from the coin. The movement data may be detected by sensors at 1902 that may be coupled with the coin in some embodiments so that movement may be directly measured other indirect measurement embodiments may be detected by sensors that are not directly coupled with the coin for example. The movement data may be communicated via a communication system at 1903. The movement may be displayed on a computer display (for possible overlaying of video or other graphics to include with the virtual coin for example) at 1904. Any other method of displaying a graphical coin that represents an actual coin toss is in keeping with the spirit of the invention whether directly or indirectly sensed.

Figure 11:
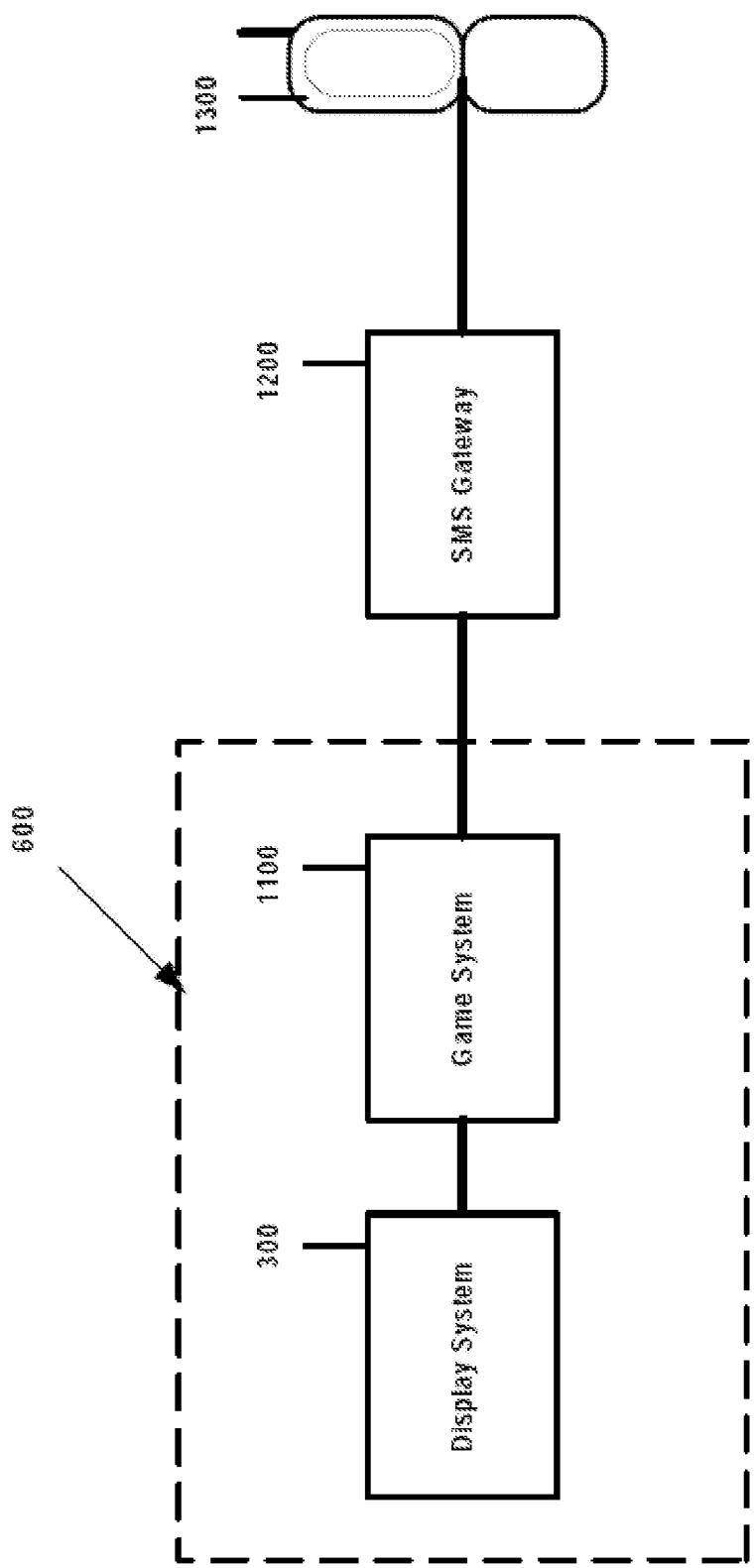
FIG. 11 shows a block diagram of the components used to enable participants with cell phones to play a game of chance and win a prize.

FIG. 11 illustrates the components used for a text-based game of chance in combination with other components of this invention. To simplify the diagram, the Display System 300 is shown without sensor system 100 and communication system 200 that may optionally couple with Display System 300 in certain embodiments of the invention. The Display System 300 may be coupled with the Game System 1100 via a data path. The Game System is connected to the SMS (Short Message Service) Gateway 1200 via a data path. The SMS Gateway is connected to a Cell Phone 1300 via a data path. The data path connecting the Cell Phone to the SMS Gateway, for example may be implemented with a cell phone service provider's radio frequency infrastructure.

Operation of Text-based Game with an Instrumented Coin and Other Components of this Invention Yet another addition to aforementioned aspects of this invention, the pseudo random number as described in the display system section above can be used to select a winner from participating cell phone users who are watching TV or other live video. This text-based game of chance, allows more than just the viewers in the stadium audience to be involved a game of chance. Any person with a text-capable cell phone can be involved. A specific description for a text-based game of chance follows. Variations from this specific description are possible and these variations are within the scope of this invention as the description of the game herein is exemplary only and is not intended to limit the invention. For example, it is understood that a user on a computer with access to a website may also play the game as long as the game system is connected to the Internet for example.

Before the coin toss cell phone users who wish to participate send a text message to a destination shown to them on video, JUMBOTRON® or by other means. The text message can contain the viewer's input, i.e., participant's guess of how the coin will land during the coin toss, i.e., the result of the coin toss after the coin has been tossed. For example, the participant can send a text message containing the letter "H" or word "heads" to guess that the coin will land heads up. Alternately the participant can be instructed to send a text message to one specific destination if they wish to guess "heads" or send to another specific destination if they wish to guess "tails." The text message for the participant's guess originates at a cell phone (FIG. 11, 1300) and is communicated via the SMS Gateway (FIG. 11, 1200) to the Game System (FIG. 11, 1100). Numerous commercial providers can supply the SMS Gateway or license its use. The Game System generates a unique game number (UGN) for the participant. In a record, the Game System stores the UGN, stores the guess (heads or tails), and stores the originating phone's identification (PID). The Game System sends the UGN in a UGN text message back to the participant. The Game System processes text messages and stores records for each participant that sends a text message.

After the coin has been tossed, the Display System (FIG. 11, 300) may send the pseudo random number if less than the entire set of correct guesses is to be awarded prize(s) (as described previously in the Graphical Display section) and the coin's landing orientation (heads or tails) to the Game System. Based on the landing orientation, the Game System can prevent the records of participants who have made the incorrect guess from being selected as a winner. Using the pseudo random number, the Game System can select the record of the winner or winners from the participants who have made the correct heads or tails guess. Using the record of the winner, the Game System can send the UGN of winning participant(s) to the Display System. In one embodiment, the Display System can display the UGN and the UGN can be displayed to the TV or other live video. To claim the winning prize, the winning participant can compare the UGN on video to the UGN sent to him in the UGN text message. If the UGNs match, the participant can send a "Claiming" text message to a specific destination. There can be a limit on how much time can elapse before the participant can send the "Claiming" text message. The Claiming text message is sent via the SMS Gateway to the Game System. Using the PID in the Claiming text message, the Game System compares the PID in the Claiming message to the PID stored in the record of the winning participate. If the PIDs match, then the participant has successfully claimed the prize. In other embodiments, the winner(s) of the game, i.e., those who correctly guessed the coin to go to a particular location, for example to collect a prize such as a soft drink, food item, hat, or other prize.

In one or more embodiments of the invention, the viewer(s) who won the game can be prompted to take a picture, for example of themselves which can for example be displayed (after management approval for appropriateness for example) on a JUMBOTRON® or on the television. In addition, if the viewer's cell phone contains a location device or location calculation capability, for example such as GPS, then the location can also be displayed, for example, "John Smith of San Diego has guessed Heads and has won a prize". Alternatively, the location can be utilized to find the winning viewer in a stadium for example to point the cameras at the location of the winning viewer. Any other information associated with the winning viewer, such as a winning viewer text message, or sound, or any other data collectable from the viewer's cell phone (or computer for non-cell phone embodiments) may be utilized in displaying information associated with the winning viewer(s).

In addition, other games of chance, such as a trivia game, dice roll, or any other type of game have a plurality of outcomes may be utilized to query input from viewers that are then selected as winner(s), either as a group, a subset of the group or as an individual.

Operation of Text-based Game without an Instrumented Coin and with only a Display System as describe herein.

Operation is similar to the previous description up to where the coin is tossed. Instead of the instrumented coin, a normal (non-instrumented) coin is thrown during the toss. After the coin has been tossed, an operator manually interacts with the Display System and selects what side of the coin landed up, heads or tails. Once the operator selects the landing orientation the Display System generates a pseudo random number and sends the random number and the coin's landing orientation to the Game System. The remainder of the operation is similar to the description using the instrumented coin.

In summary, the two text-based game of chance descriptions are different with regard to how the landing orientation of a coin toss is detected and how the pseudo random number is generated. In one case, the instrumented coin (or viewed coin) and other components of this invention supplies the landing orientation and generates and supplies the pseudo random number based on the dynamic data of the instrumented coin. In the other case the landing orientation is detected by a person and manually inputted into the system, and the random number is generated by the system without being based on instrumented coin dynamic data.

The use of the unique game identifier that is input as viewer input allows a time window to start wherein viewer input after a predefined time window associated with the unique game identifier are disabled. For example, viewers that are not watching a commercial where the game is announced in a portion of the screen, cannot win since they input their guess after the time window closes. This ensures that only viewers that are watching the commercial win for example, which can be utilized to increase commercial viewing.

While the invention herein disclosed has been described by means of specific embodiments and applications thereof, numerous modifications and variations could be made thereto by those skilled in the art without departing from the scope of the invention set forth in the claims.

LISTING 1 is the Java code for calculating the coin's tilt along an axis for the preferred embodiment.

```
float calcAxisTilt(float axisAccel, float crossAxisAccel, float
    verticalAxisAccel) {
    double tmp;
    double denom;
    double numerator;
    numerator = axisAccel;
    denom = Math.sqrt(Math.pow(crossAxisAccel, 2) +
        Math.pow(verticalAxisAccel, 2));
    tmp = Math.atan(numerator / denom);
    if (verticalAxisAccel < 0.0) {
        tmp = PI2 / 4 + (PI2 / 4 - tmp);
    }
    if (tmp < 0.0) {
        tmp += PI2;
    }
    return ( (float) tmp);
}
```

LISTING 2A is the Java code for calculating the coin's displacement (spatial position) during the launch condition for the preferred embodiment.

```
public void calcDisplacement(Accelerometer accelerometer, double sec) {
    double deltaV;
    double deltaDisplacement;
    double relativeAccel;
    relativeAccel = accelerometer.calcRelativeAccel(
        Math.abs(accelerometer.getYAccelMetric( )));
    deltaV = Math.abs(accelerometer.getDeltaVelocity(relativeAccel, sec));
    accelerometer.setVelocity( (float) (deltaV +
        accelerometer.getVelocity( )));
    deltaDisplacement = accelerometer.getVelocity( ) * sec;
    deltaDisplacement *= Accelerometer.
        DELTA_DISPLACEMENT_FACTOR;
    accelerometer.setDisplacement( (float) (deltaDisplacement +
        accelerometer.getDisplacement( )));
}
```

LISTING 2B is the Java code for calculating the coin's displacement (spatial position) during the in-flight condition for the preferred embodiment.

```
public void calcDisplacement(Accelerometer accelerometer, double sec) {
    double relativeAccel;
    double xAccel;
    double deltaV;
    double deltaDisplacement;
    relativeAccel = accelerometer.calcRelativeAccel(
        Math.abs(accelerometer.getY2AccelMetric( )));
    xAccel = Math.max(Math.abs(accelerometer.getXAccelG( )),
        Math.abs(accelerometer.getXAccelG( )));
    deltaV = Accelerometer.G_METERS_PER_SEC2 * sec * -1;
    accelerometer.setVelocity( (float) (deltaV +
        accelerometer.getVelocity( )));
    deltaDisplacement = accelerometer.getVelocity( ) * sec;
    deltaDisplacement *= Accelerometer.
        DELTA_DISPLACEMENT_FACTOR;
    accelerometer.setDisplacement( (float) (deltaDisplacement +
        accelerometer.getDisplacement( )));
}
```

LISTING 3 is the Java code for calculating the coin's rate of rotation for the preferred embodiment.

```
public synchronized double getRotationRate( ) {
    double a = getCentripetalAccelMetric( );
    double v = Math.sqrt(a * RADIUS_METERS);
    double radsSec = v / RADIUS_METERS;
    return (radsSec);
}
```

LISTING 4 is the Java code for calculating the coin's tilt angle for the external sensing embodiment.

```
float calcAxisTilt (float priorTiltAngleRadians, float
    minorOverMajorAxisRatio) {
    float diff;
    float tmpDiff;
    float radians;
    float tmpRadians;
    // quadrant 1
    float baseRadians = (float)Math.acos(axisRatio);
    radians = tmpRadians = baseRadians;
    diff = Math.abs(tmpRadians - priorTiltAngleRadians);
    // quadrant 2
    tmpRadians = (float)(Math.PI - baseRadians);
    tmpDiff = Math.abs(tmpRadians - priorTiltAngleRadians);
    if(tmpDiff < diff) {
        diff = tmpDiff;
        radians = tmpRadians;
```

-continued

```
    }
    // quadrant 3
    tmpRadians = (float)(Math.PI + baseRadians);
    tmpDiff = Math.abs(tmpRadians – priorTiltAngleRadians);
    if(tmpDiff < diff) {
        diff = tmpDiff;
        radians = tmpRadians;
    }
    // quadrant 4
    tmpRadians = (float)(2 * Math.PI – baseRadians);
    tmpDiff = Math.abs(tmpRadians – priorTiltAngleRadians);
    if(tmpDiff < diff) {
        diff = tmpDiff;
        radians = tmpRadians;
    }
    return(radians);
}
```

LISTING 5 is the Java code for calculating the coin's rate of rotation for the external sensing embodiment.

```
public synchronized double calcRotationRate(int numberOfFrames) {
    double time = numberOfFrames * FRAME_PERIOD_MILLISEC;
    double radsSec = PI/time;
    return (radsSec);
}
```

What is claimed is:

1. A system for playing a game based on a coin toss comprising:
   a coin object configured with first and second substantially planar sides parallel to one another wherein said first and second substantially planar sides are connected with one another via a cylindrical section and wherein said first substantially planar side is designated heads and said second substantially planar side is designated tails;
   a display system configured to display
      said coin object or
      a representation of said coin object or
      a reference to said coin object or
      data related to a coin toss of said coin object or
      data related to a coin toss result of said coin toss of said coin object or
      any combination thereof;
   a game system coupled with the display system and configured to
      receive viewer input associated with said coin toss of said coin object and
      compare said viewer input to said coin toss result and select one or more viewers that have correctly input the coin toss result; and,
   said display system further configured to display information associated with said one or more viewers that have correctly input the coin toss result.

2. The system for playing a game based on a coin toss of claim 1 further comprising:
   a sensor system configured to detect an orientation or movement of said coin object and output said data representative of said coin toss wherein said orientation is output as said heads when said first substantially planar side is oriented vertically up and wherein said orientation is output as said tails when said second substantially planar side is oriented vertically up; and,
   a communication system configured to communicate said data representative of said coin toss of said coin object to said display system.

3. The system for playing a game based on a coin toss of claim 2 wherein said sensor system processes images with
   a Kalman tracking algorithm or
   a Circle Hough Transform algorithm or
   a Fast Circle Detection algorithm or
   a real-time circle or an ellipse detection algorithm.

4. The system for playing a game based on a coin toss of claim 1 wherein an operator interacts with said display system to input said coin toss result.

5. The system for playing a game based on a coin toss of claim 1 wherein said games system disables said viewer input after a predefined time window.

6. The system for playing a game based on a coin toss of claim 1 wherein said display system is further configured to display at least one picture associated with said one or more viewers that have correctly input the coin toss result.

7. The system for playing a game based on a coin toss of claim 1 wherein said display system is further configured to display at least one location associated with said one or more viewers that have correctly input the coin toss result.

8. The system for playing a game based on a coin toss of claim 1 further comprising:
   a message gateway coupled with said gaming system and configured to interact with at least one cell phone.

9. The system for playing a game based on a coin toss of claim 1 further comprising:
   a communication system configured to communicate said data representative of said coin toss of said coin object;
   a transmitter associated with said communication system wherein said transmitter is coupled with said coin object;
   a receiver system configured to receive said data representative of said coin toss; and,
   wherein said display system is coupled with said receiver system.

10. The system for playing a game based on a coin toss of claim 1 further comprising:
    a communication system configured to communicate said data representative of said coin toss of said coin object;
    a transmitter associated with said communication system wherein said transmitter is coupled with a camera; and,
    a receiver system configured to receive said data representative of said coin toss; and,
    wherein said display system is coupled with said receiver system.

11. The system for playing a game based on a coin toss of claim 1 further comprising:
    a communication system configured to communicate said data representative of said coin toss of said coin object; and,
    wherein said communications system includes a transceiver.

12. The system for playing a game based on a coin toss of claim 1 comprising:
    a communication system configured to communicate said data representative of said coin toss of said coin object; and,
    a repeater coupled with said communication system.

13. The system for playing a game based on a coin toss of claim 1 wherein said graphical coin includes images other than said heads and said tails of said coin object.

14. The system for playing a game based on a coin toss of claim 1 wherein said graphical coin is displayed along with audio representative of movement of said coin object.

15. The system for playing a game based on a coin toss of claim 1 wherein said coin toss is utilized to generate at least one random number for a game of chance.

16. A method for playing a game based on a coin toss comprising:
  displaying via a display system
    a coin object configured with first and second substantially planar sides parallel to one another wherein said first and second substantially planar sides are connected with one another via a cylindrical section and wherein said first substantially planar side is designated heads and the second substantially planar side is designated tails, or
    a representation of said coin object or
    a reference to said coin object or
    data related to a coin toss of said coin object or
    data related to a coin toss result of said coin toss of said coin object or
    any combination thereof;
  receiving viewer input via a game system coupled with the display system wherein said game system receives viewer input associated with said coin toss of said coin object;
  comparing said viewer input via said game system to said coin toss result and select one or more viewers that have correctly input the coin toss result; and,
  displaying information associated with said one or more viewers that have correctly input the coin toss result via said display system.

17. The method for playing a game based on a coin toss of claim 16 further comprising:
  detecting via a sensor system an orientation or movement of said coin object and outputting said data representative of said coin toss wherein said orientation is output as said heads when said first substantially planar side is oriented vertically up and wherein said orientation is output as said tails when said second substantially planar side is oriented vertically up; and,
  communicating via a communication system said data representative of said coin toss of said coin object to said display system.

18. The system for playing a game based on a coin toss of claim 16 further comprising inputting said coin toss result into said display system via an operator.

19. The method for playing a game based on a coin toss of claim 16 further comprising:
  disabling said viewer input via said game system after a predefined time window.

20. The method for playing a game based on a coin toss of claim 16 further comprising:
  displaying said one or more viewers that have correctly input the coin toss result.

\* \* \* \* \*